United States Patent
Zhang et al.

(10) Patent No.: US 11,808,928 B2
(45) Date of Patent: Nov. 7, 2023

(54) COMBINED ZOOM DUAL-CAMERA LENS ASSEMBLY

(71) Applicant: ZHEJIANG SUNNY OPTICS CO., LTD., Zhejiang (CN)

(72) Inventors: Yi Zhang, Zhejiang (CN); Kaiyuan Zhang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 16 days.

(21) Appl. No.: 17/421,027

(22) PCT Filed: May 8, 2020

(86) PCT No.: PCT/CN2020/089085
§ 371 (c)(1),
(2) Date: Jul. 7, 2021

(87) PCT Pub. No.: WO2020/238577
PCT Pub. Date: Dec. 3, 2020

(65) Prior Publication Data
US 2022/0075162 A1    Mar. 10, 2022

(30) Foreign Application Priority Data
May 30, 2019  (CN) .......................... 201910461853.8

(51) Int. Cl.
*G02B 15/14*       (2006.01)
*G02B 13/00*       (2006.01)
(Continued)

(52) U.S. Cl.
CPC ......... *G02B 15/142* (2019.08); *G02B 13/009* (2013.01); *G02B 13/0015* (2013.01); *G02B 13/02* (2013.01); *G02B 13/06* (2013.01)

(58) Field of Classification Search
CPC .................... G02B 15/142; G02B 13/0015; G02B 13/009; G02B 13/02; G02B 13/06; G02B 15/1421; G02B 7/09; G02B 15/177
See application file for complete search history.

(56) References Cited

U.S. PATENT DOCUMENTS

| | | | | |
|---|---|---|---|---|
| 10,708,492 | B2* | 7/2020 | Venkataraman | H04N 23/69 |
| 2016/0227089 | A1* | 8/2016 | Lin | G02B 15/00 |

(Continued)

FOREIGN PATENT DOCUMENTS

| | | |
|---|---|---|
| CN | 104007537 A | 8/2014 |
| CN | 107577033 A | 1/2018 |

(Continued)

*Primary Examiner* — Alicia M Harrington
(74) *Attorney, Agent, or Firm* — Gang Yu

(57) ABSTRACT

The disclosure provides a combined zoom dual-camera lens assembly, which includes a first lens group and a second lens group, wherein a field of view of the second lens group is larger than a field of view of the first lens group, and a thickness of the second lens group is smaller than a thickness of the first lens group; and a total effective focal length $f_T$ of the first lens group and a total effective focal length $f_W$ of the second lens group meet $f_T/f_W>9.00$.

18 Claims, 13 Drawing Sheets

(51) Int. Cl.
    *G02B 13/02*    (2006.01)
    *G02B 13/06*    (2006.01)

(56) References Cited

U.S. PATENT DOCUMENTS

2017/0094183 A1    3/2017    Miller et al.
2020/0096732 A1*    3/2020    Lee ..................... H04N 23/667

FOREIGN PATENT DOCUMENTS

| | | |
|---|---|---|
| CN | 109557643 A | 4/2019 |
| CN | 208890907 A | 5/2019 |
| CN | 110058389 A | 7/2019 |
| JP | 2017182096 A | 10/2017 |
| JP | 2018036660 A | 3/2018 |

* cited by examiner

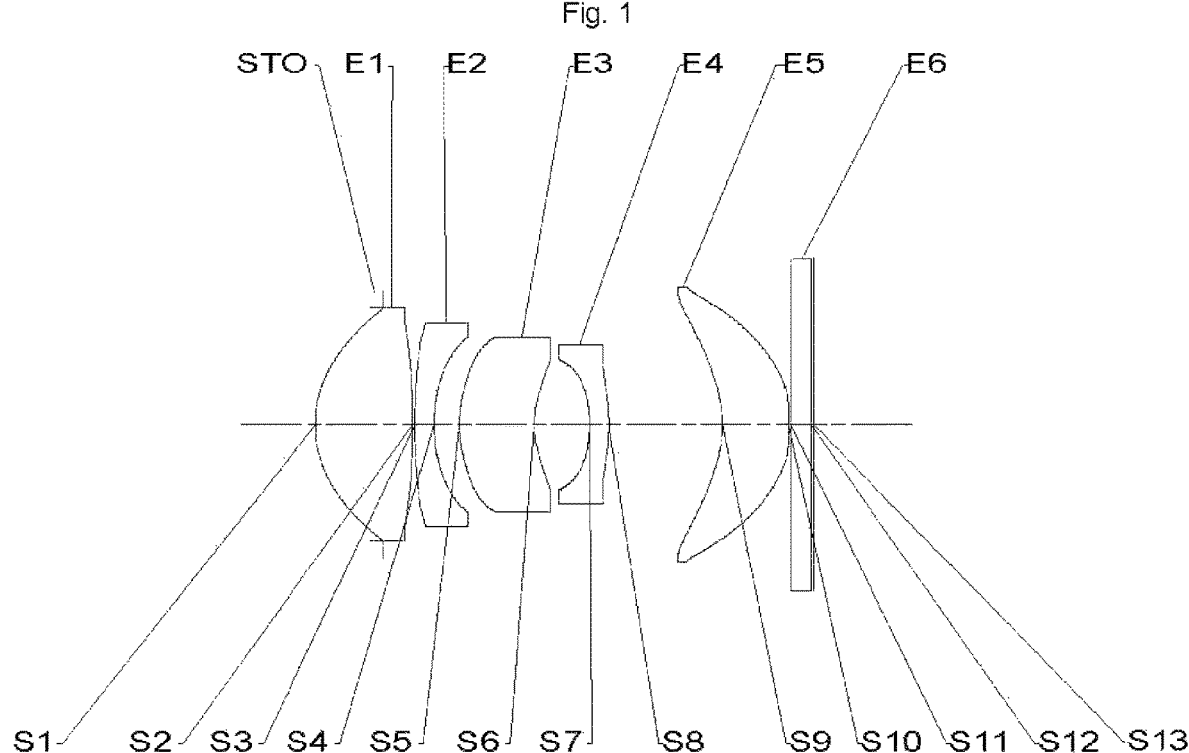
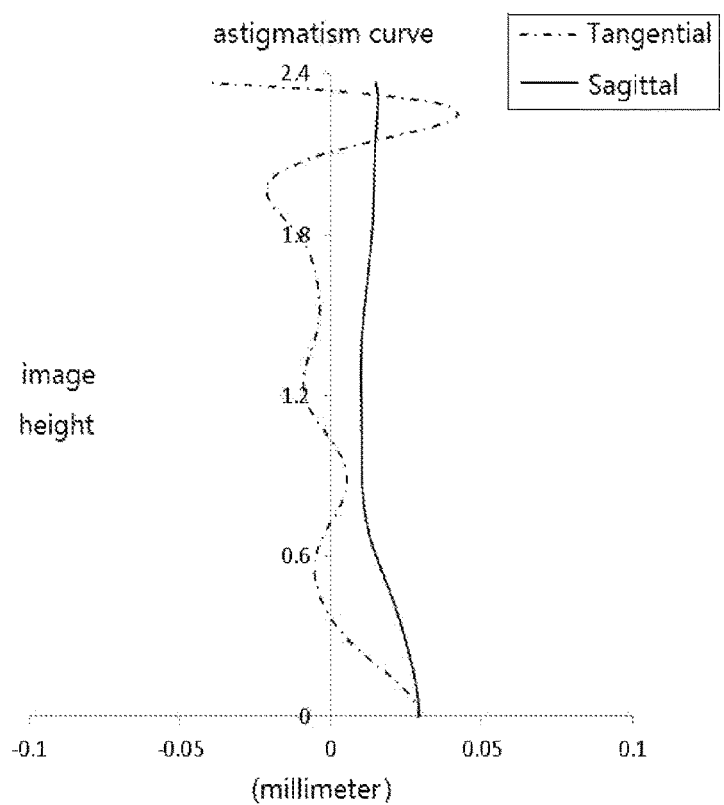

astigmatism curve

COMBINED ZOOM DUAL-CAMERA LENS ASSEMBLY

CROSS-REFERENCE TO RELATED DISCLOSURE

The disclosure claims priority to and benefit of Chinese Patent Disclosure No. 201910461853.8, filed in the China National Intellectual Property Administration (CNIPA) on May 30, 2019, the entire contents of which are incorporated herein by reference.

TECHNICAL FIELD

The disclosure relates to a combined zoom dual-camera lens assembly, and more particularly to a combined zoom dual-camera lens assembly including a wide-angle lens group and a telephoto lens group.

BACKGROUND

With the rapid development of the mobile phone industry, people have made increasingly stringent requirements on the imaging quality and other camera functions of portable electronic devices. For an ordinary single-lens camera of a mobile phone, the image quality may usually be further improved only by increasing the number of lenses. However, the increase of the number of lenses is apparently unfavorable for miniaturization of the camera, and a market requirement is unlikely to meet. In addition, unlike random zooming of professional camera equipment such as a single lens reflex camera, conventional optical zooming usually involves a mechanical movement of a lens group, may result in an increase of a Total Track Length (TTL) of the lens and may also not meet a present trend of development to ultrathin designs.

Therefore, how to combine present wide-angle and telephoto dual-camera lens assembly to solve problems about optical zooming of a portable device without influencing a thickness of the portable device is one of problems urgent to be solved in this field.

SUMMARY

Some embodiments of the disclosure provide a combined zoom dual-camera lens assembly capable of at least overcoming or partially overcoming at least one shortcoming, such as a combined zoom dual-camera lens assembly with a high-ratio zooming characteristic.

The disclosure provides a combined zoom dual-camera lens assembly, which includes a first lens group and a second lens group, wherein a field of view of the second lens group is larger than a field of view of the first lens group, and a thickness of the second lens group is smaller than a thickness of the first lens group.

In an implementation mode, a total effective focal length $f_T$ of the first lens group and a total effective focal length $f_W$ of the second lens group meet $f_T/f_W>9.00$.

In an implementation mode, $ImgH_T$ is a half of a diagonal length of an effective pixel region on an imaging surface of the first lens group, an overall thickness T of the combined zoom dual-camera lens assembly and $ImgH_T$ meet $2.00<T/ImgH_T<3.00$.

In an implementation mode, the first lens group at least includes a first lens closest to an object side; the second lens group at least includes a first lens closest to the object side; and a distance $TTL_T$ from an object-side surface of the first lens of the first lens group to an imaging surface of the first lens group on an optical axis of the first lens group and a distance TTL from an object-side surface of the first lens of the second lens group to an imaging surface of the second lens group on an optical axis of the second lens group meet $1.00<TTL_T/TTL_W<1.50$.

In an implementation mode, $ImgH_T$ is a half of a diagonal length of the effective pixel region on the imaging surface of the first lens group, $ImgH_W$ is a half of a diagonal length of an effective pixel region on the imaging surface of the second lens group, $ImgH_T$ and $ImgH_W$ meet $1.00<ImgH_T/ImgH_W<2.00$.

In an implementation mode, the first lens group sequentially includes, from the object side to the imaging surface of the first lens group along the optical axis of the first lens group: a first lens with a positive refractive power, an object-side surface thereof being a convex surface; a second lens with a refractive power, an image-side surface thereof being a concave surface; a third lens with a refractive power, an object-side surface thereof being a convex surface; a fourth lens with a refractive power; and a fifth lens with a refractive power, an object-side surface thereof being a convex surface. Optionally, a distance $TTL_T$ from the object-side surface of the first lens of the first lens group to the imaging surface of the first lens group on the optical axis of the first lens group and the total effective focal length $f_T$ of the first lens group meet $TTL_T/f_T<1.00$. Optionally, a curvature radius $R4_T$ of the image-side surface of the second lens of the first lens group and a curvature radius $R5_T$ of the object-side surface of the third lens of the first lens group meet $1.00<R4_T/R5_T<2.50$. Optionally, the total effective focal length $f_T$ of the first lens group and a curvature radius $R1_T$ of the object-side surface of the first lens of the first lens group meet $3.50<f_T/R1_T<4.50$. Optionally, a spacing distance $T45_T$ of the fourth lens and fifth lens of the first lens group on the optical axis of the first lens group and a distance $TTL_T$ from the object-side surface of the first lens of the first lens group to the imaging surface of the first lens group on the optical axis of the first lens group meet $2.00<(10\times T45_T)/TTL_T<3.00$. Optionally, an effective focal length $f1_T$ of the first lens of the first lens group and an on-axis distance $SAG21_T$ from an intersection point of an object-side surface of the second lens of the first lens group and the optical axis of the first lens group to an effective radius vertex of the object-side surface of the second lens meet $20.00<f1_T/SAG21_T<35.00$.

In an implementation mode, the second lens group sequentially includes, from an object side to an imaging surface of the second lens group along the optical axis of the second lens group: a first lens with a negative refractive power; a second lens with a positive refractive power, an object-side surface thereof being a convex surface; a third lens with a refractive power; a fourth lens with a refractive power, an image-side surface thereof being a concave surface; and a fifth lens with a positive refractive power. Optionally, Semi-$FOV_W$ is a half of a maximum field of view of the second lens group, Semi-$FOV_W$ meets Semi-$FOV_W>63.0°$. Optionally, $ImgH_W$ is a half of a diagonal length of the effective pixel region on the imaging surface of the second lens group and a center thickness $CT2_W$ of the second lens of the second lens group on the optical axis of the second lens group meet $4.00<(10\times CT2_W)/ImgH_W<6.00$.

In an implementation mode, a spacing distance t between the first lens group and the second lens group may meet $0.50$ mm$<t<3.00$ mm.

According to the disclosure, two different lens groups are arranged in the combined zoom dual-camera lens assembly, and the refractive power and surface types of each lens in the two lens groups, the center thickness of each lens, on-axis distances between the lenses and the like are reasonably configured to at least achieve the following beneficial effects of the combined zoom dual-camera lens assembly: the two different lens groups are combined into a single dual-camera lens, so that miniaturization and high imaging quality of the combined zoom dual-camera lens assembly may be ensured, and meanwhile, different camera modes are alternately used to achieve a high-ratio mixed optical zooming effect, for example, an optical zoom ratio may be more than 5, to realize a good zooming telephoto function.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings:

FIG. 1 is a structure diagram of a telephoto lens group according to embodiment 1 of the disclosure;

FIG. 2A to FIG. 2C show an astigmatism curve, a distortion curve and a lateral color curve of a telephoto lens group according to embodiment 1 respectively;

DETAILED DESCRIPTION OF THE EMBODIMENTS

Figure 2B:
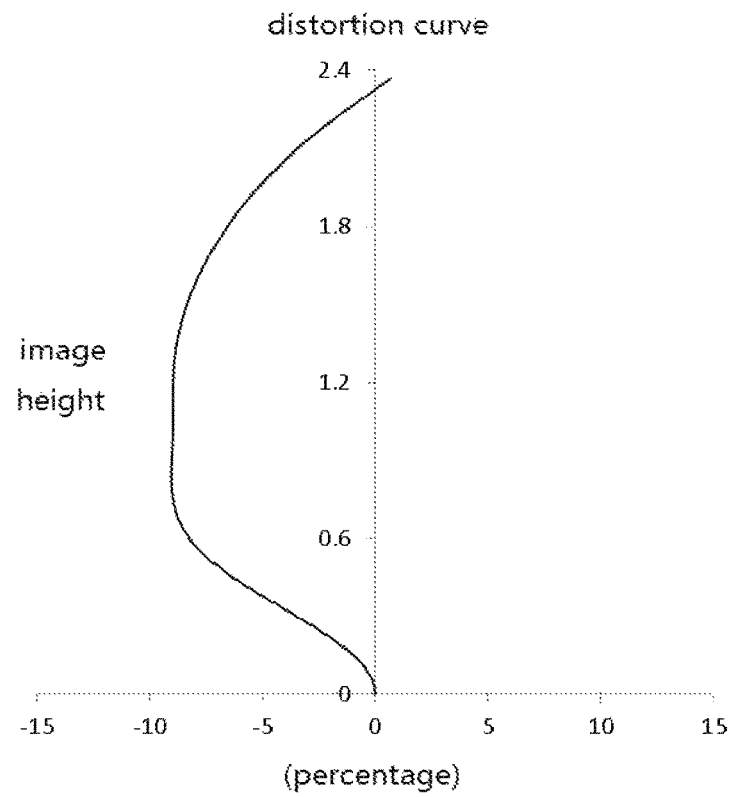

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

A combined zoom dual-camera lens assembly according to an exemplary implementation mode of the disclosure may include a first lens group and a second lens group, wherein a field of view of the second lens group may be larger than a field of view of the first lens group, and a thickness of the second lens group may be smaller than a thickness of the first lens group. For example, the second lens group may be a thin lens group with a large field of view.

In the exemplary implementation mode, the first lens group may be a telephoto lens group with a telephoto characteristic (compared with the second lens group), and the second lens group may be a wide-angle lens group with a wide-angle characteristic (compared with the first lens group). The telephoto lens group and the wide-angle lens group are used alternately in a shooting process of the combined zoom dual-camera lens assembly to achieve a mixed optical zooming effect and facilitate promotion of development of a lossless zooming technology for combined zoom dual-camera lens assembly, for example, mobile phones.

In the exemplary implementation mode, the combined zoom dual-camera lens assembly of the disclosure may meet a conditional expression $f_T/f_W>9.00$, wherein $f_T$ is a total effective focal length of the telephoto lens group, and $f_W$ is a total effective focal length of the wide-angle lens group. More specifically, referring to the following Table 3 and Table 7, selecting a combination of a telephoto lens group corresponding to $f_T=7.11$ mm and a wide-angle lens group corresponding to $f_W=0.72$ mm may ensure that $f_T$ and $f_W$ further meet $f_T/f_W>9.88$. The conditional expression $f_T/f_W>9.00$, so that an optical zoom ratio of the whole combined zoom dual-camera lens assembly may be more than 5, and a good zooming telephoto function may be realized.

In the exemplary implementation mode, the combined zoom dual-camera lens assembly of the disclosure may meet a conditional expression $2.00<T/ImgH_T<3.00$, wherein T is an overall thickness of the combined zoom dual-camera lens assembly, and $ImgH_T$ is a half of a diagonal length of an effective pixel region on an imaging surface of the telephoto lens group. More specifically, T and $ImgH_T$ may further meet $2.50<T/ImgH_T<3.00$, for example, $2.63 \le T/Img_T \le 2.96$. The conditional expression $2.00<T/ImgH_T<3.00$ is met, so that the overall thickness of the combined zoom dual-camera lens assembly may be controlled effectively, and achievement of an ultrathin feature and high-resolution characteristic of the combined zoom dual-camera lens assembly is facilitated. In general, a TTL of the telephoto lens group is larger than a TTL of the wide-angle lens group. Therefore, herein, the overall thickness T of the combined zoom dual-camera lens assembly can be understood as the thickness of the telephoto lens group, i.e., a distance $TTL_T$ from an object-side surface of a first lens of the telephoto lens group to the imaging surface of the telephoto lens group on an optical axis of the telephoto lens group.

In the exemplary implementation mode, the combined zoom dual-camera lens assembly of the disclosure may meet a conditional expression $1.00<TTL_T/TTL_W<1.50$, wherein $TTL_T$ is the distance from the object-side surface of the first lens of the telephoto lens group to the imaging surface of the telephoto lens group on the optical axis of the telephoto lens group, and $TTL_W$ is a distance from an object-side surface of a first lens of the wide-angle lens group to an imaging surface of the wide-angle lens group on an optical axis of the wide-angle lens group. More specifically, $TTL_T$ and $TTL_W$ may further meet $1.20<TTL_T/TTL_W<1.40$, for example, $1.30 \le TTL_T/TTL_W \le 0.36$. The conditional expression $1.00<TTL_T/TTL_W<1.50$ is met, so that a TTL difference of the telephoto lens group and the wide-angle lens group may be in a reasonable range, and assembling of modules is facilitated.

In the exemplary implementation mode, the combined zoom dual-camera lens assembly of the disclosure may meet a conditional expression $1.00<ImgH_T/ImgH_W<2.00$, wherein $ImgH_T$ is a half of the diagonal length of the effective pixel region on the imaging surface of the telephoto lens group, and $ImgH_W$ is a half of a diagonal length of an effective pixel region on the imaging surface of the wide-angle lens group. More specifically, $ImgH_T$ and $ImgH_W$ may further meet $1.50<ImgH_T/ImgH_W<1.70$, for example, $1.53 \le ImgH_T/ImgH_W \le 1.69$. The conditional expression $1.00<ImgH_T/ImgH_W<2.00$ is met, so that a difference between specifications of chips matched with the telephoto lens group and the wide-angle lens group respectively is in a reasonable range, and good user experiences in shooting effects may be ensured.

Figure 13:
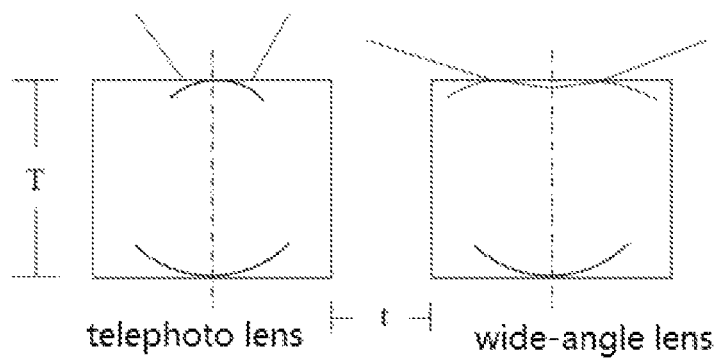
FIG. 13 is a structure diagram of a combined zoom dual-camera lens assembly according to the disclosure.

FIG. 13 is a structure diagram of a combined zoom dual-camera lens assembly including a telephoto lens group and a wide-angle lens group according to the disclosure. A spacing distance t between the telephoto lens group and the wide-angle lens group may be regulated as required in a production and assembling process to achieve a best imaging effect of the zoom dual-camera lens, and is kept unchanged when the zoom dual-camera lens is used (for example, in a shooting process after assembling). In the exemplary implementation mode, the spacing distance t between the telephoto lens group and the wide-angle lens group may meet a conditional expression $0.5$ mm$<t<3.00$ mm. The conditional expression $0.5$ mm$<t<3.00$ is met, so that the telephoto lens group and the wide-angle lens group may be effectively prevented from blocking light of each other, mutual influences on luminous fluxes of the two may be eliminated, and meanwhile, a smooth zooming transition is formed between the two lens groups to achieve the best imaging effect.

In the exemplary implementation mode, the telephoto lens group and the wide-angle lens group may be on the same side of the combined zoom dual-camera lens assembly such that they may shoot an object on the same side of the combined zoom dual-camera lens assembly (for example, in front of or behind the combined zoom dual-camera lens assembly).

In the exemplary implementation mode, the telephoto lens group and the wide-angle lens group may be arranged longitudinally or transversely on one side of the combined zoom dual-camera lens assembly. The telephoto lens group and the wide-angle lens group are arranged close to each other by longitudinal arrangement or transverse arrangement, so that, on one hand, chips may be arranged regularly in the combined zoom dual-camera lens assembly, and internal elements may be arranged and wired more easily; and on the other hand, a more attractive appearance may be achieved, and the user may hold the device more conveniently without thinking too much about whether a lens is occluded or not due to an incorrect holding gesture. It should be understood that "longitudinal arrangement" can be understood as a mode that the telephoto lens group and the wide-angle lens group are arranged with one above the other relative to a using direction of the combined zoom dual-camera lens assembly and "transverse arrangement" can be understood as a mode that the telephoto lens group and the wide-angle lens group are arranged with one on the left of the other relative to the using direction of the combined zoom dual-camera lens assembly. In addition, it should also be understood that an arrangement manner of the telephoto lens group and the wide-angle lens group is not limited thereto and relative positions thereof may be regulated according to a practical design requirement.

In the exemplary implementation mode, each of the telephoto lens group and the wide-angle lens group may also include an electronic photosensitive element for imaging on the respective imaging surface, and the electronic photosensitive element may be a Charge Coupled Device (CCD) or a Complementary Metal Oxide Semiconductor (CMOS). In addition, the combined zoom dual-camera lens assembly described according to the disclosure may be an imaging apparatus (such as an independent imaging device like a digital camera, etc.) that may be used independently, and may also be an imaging module arranged in a portable electronic device.

The telephoto lens group and wide-angle lens group applied to the combined zoom dual-camera lens assembly according to the disclosure will be described below in detail.

(1) Telephoto Lens Group

The telephoto lens group according to the disclosure may include, for example, five lenses with refractive power, i.e., a first lens, a second lens, a third lens, a fourth lens and a fifth lens. The five lenses are sequentially arranged from an object side to an image side along an optical axis. In the first lens to fifth lens of the telephoto lens group, there may be an air space between any two adjacent lenses.

In the exemplary implementation mode, in the telephoto lens group, the first lens may have a positive refractive power, and an object-side surface thereof may be a convex surface; the second lens has a positive refractive power or a negative refractive power, and an image-side surface thereof may be a concave surface; the third lens has a positive refractive power or a negative refractive power, and an object-side surface thereof may be a convex surface; the fourth lens has a positive refractive power or a negative refractive power; and the fifth lens has a positive refractive power or a negative refractive power, and an object-side surface thereof may be a convex surface.

In the exemplary implementation mode, an image-side surface of the third lens of the telephoto lens group may be a concave surface.

In the exemplary implementation mode, the fourth lens of the telephoto lens group may have a negative refractive power, and an object-side surface thereof may be a concave surface.

In the exemplary implementation mode, the combined zoom dual-camera lens assembly of the disclosure may meet a conditional expression $TTL_T/f_T<1.00$, wherein $TTL_T$ is a distance from the object-side surface of the first lens of the telephoto lens group to an imaging surface of the telephoto lens group on the optical axis of the telephoto lens group, and $f_T$ is a total effective focal length of the telephoto lens group. More specifically, $TTL_T$ and $f_T$ may further meet $0.80<TTL_T/f_T<0.90$, for example, $0.81 \leq TTL_T/f_T \leq 0.84$. The conditional expression $TTL_T/f_T<1.00$ is met, so that a relatively good telephoto function of the telephoto lens group may be ensured effectively.

In the exemplary implementation mode, the combined zoom dual-camera lens assembly of the disclosure may meet a conditional expression $1.00<R4_T/R5_T<2.50$, wherein $R4_T$ is a curvature radius of the image-side surface of the second lens of the telephoto lens group, and $R5_T$ is a curvature radius of the object-side surface of the third lens of the telephoto lens group. More specifically, $R4_T$ and $R5_T$ may further meet $1.00<R4_T/R5_T<2.10$, for example, $1.06 \leq R4_T/R5_T \leq 2.05$. The conditional expression $1.00<R4_T/R5_T<2.50$ is met, so that spherical aberration contributions of the second lens and third lens of the telephoto lens group may be effectively controlled in a reasonable range, and meanwhile, the second lens and the third lens are higher in machinability. Optionally, an object-side surface of the second lens of the telephoto lens group may be a convex surface.

In the exemplary implementation mode, the combined zoom dual-camera lens assembly of the disclosure may meet a conditional expression $3.50<f_T/R1_T<4.50$, wherein $f_T$ is the total effective focal length of the telephoto lens group, and $R1_T$ is a curvature radius of the object-side surface of the first lens of the telephoto lens group. More specifically, $f_T$ and $R1_T$ may further meet $3.60<f_T/R1_T<4.30$, for example, $3.83 \leq f_T/R1_T \leq 4.14$. The conditional expression $3.50<f_T/R1_T<4.50$ is met, so that a field curvature contribution of the object-side surface of the first lens may be in a reasonable range, and furthermore, a field curvature generated by the subsequent lenses in the telephoto lens group may be balanced effectively.

In the exemplary implementation mode, the combined zoom dual-camera lens assembly of the disclosure may meet a conditional expression $2.00<(10 \times T45_T)/TTL_T<3.00$, wherein $T45_T$ is a spacing distance of the fourth lens and fifth lens of the telephoto lens group on the optical axis of the telephoto lens group, and $TTL_T$ is the distance from the object-side surface of the first lens of the telephoto lens group to the imaging surface of the telephoto lens group on the optical axis of the telephoto lens group. More specifically, $T45_T$ and $TTL_T$ may further meet $2.27 \leq (10 \times T45_T)/TTL_T \leq 2.90$. Controlling the on-axis spacing distance of the fourth lens and fifth lens of the telephoto lens group reasonably is favorable for miniaturization of the telephoto lens group and may effectively reduce the thickness sensitivity of the telephoto lens group and facilitate correction of the field curvature.

In the exemplary implementation mode, the combined zoom dual-camera lens assembly of the disclosure may meet a conditional expression $20.00<f1_T/SAG21_T<35.00$, wherein $f1_T$ is an effective focal length of the first lens of the telephoto lens group, and $SAG21_T$ is an on-axis distance from an intersection point of the object-side surface of the second lens of the telephoto lens group and the optical axis of the telephoto lens group to an effective radius vertex of the object-side surface of the second lens. More specifically, $f1_T$ and $SAG21_T$ may further meet $24.50 \leq f1_T/SAG21_T \leq 32.59$. Meeting the conditional expression $20.00<f1_T/SAG21_T<35.00$ is favorable for improving a spherical aberration in a middle field of view and a coma in a marginal field of view to endow the telephoto lens group with a higher aberration correction capability and also favorable for achieving higher machinability of the second lens of the telephoto lens group.

In the exemplary implementation mode, the telephoto lens group may further include at least one diaphragm. The diaphragm may be arranged at a proper position as required, for example, arranged between the object side and the first lens. Optionally, the telephoto lens group may further include an optical filter configured to correct a chromatic aberration and/or protective glass configured to protect a photosensitive element on the imaging surface.

The telephoto lens group according to the implementation mode of the disclosure may adopt multiple lenses, for example, the abovementioned five lenses. The refractive power and surface types of each lens, the center thickness of each lens, on-axis distances between the lenses and the like may be reasonably configured to effectively reduce the size of the telephoto lens group, reduce the sensitivity of the telephoto lens group, improve the machinability of the telephoto lens group and ensure that the telephoto lens group is more favorable for production and machining and may be applied to a portable combined zoom dual-camera lens assembly.

In the implementation mode of the disclosure, at least one of mirror surfaces of each lens in the telephoto lens group is an aspheric mirror surface, namely at least one of the object-side surface and an image-side surface of each lens in the first lens, the second lens, the third lens, the fourth lens and the fifth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible, thereby improving the imaging quality. Optionally, both the object-side surface and an image-side surface of each lens in the first lens, second lens, third lens, fourth lens and fifth lens of the telephoto lens group are aspheric mirror surfaces.

Multiple embodiments of the telephoto lens group according to the disclosure may further be described below with reference to FIG. 1 to FIG. 6C.

Embodiment 1

A telephoto lens group according to embodiment 1 of the disclosure will be described below with reference to FIG. 1 to FIG. 2C. FIG. 1 is a structure diagram of a telephoto lens group according to embodiment 1 of the disclosure.

As shown in FIG. 1, the telephoto lens group sequentially includes, from an object side to an image side along an optical axis, a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a convex surface. The fifth lens E5 has a positive refractive power, an object-side surface S9 thereof is a concave surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

Table 1 is a basic parameter table of the telephoto lens group of embodiment 1, and units of the curvature radius, the thickness and the focal length therein are all millimeter (mm).

TABLE 1

Embodiment 1: $TTL_T$ = 6.00 mm, $ImgH_T$ = 2.28 mm, Semi-$FOV_T$ = 17.0°, $Fno_T$ = 2.15, $f_T$ = 7.12 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8222 | | | | |
| S1 | Aspheric | 1.8580 | 1.1689 | 1.55 | 55.9 | 3.26 | −0.0137 |
| S2 | Aspheric | −31.8665 | 0.0300 | | | | −99.0000 |
| S3 | Aspheric | 10.1844 | 0.2300 | 1.67 | 20.4 | −5.48 | 1.1686 |
| S4 | Aspheric | 2.6598 | 0.3030 | | | | 0.1395 |
| S5 | Aspheric | 2.0378 | 0.8985 | 1.51 | 56.23 | −38.28 | 0.4307 |
| S6 | Aspheric | 1.5703 | 0.6748 | | | | −0.5316 |
| S7 | Aspheric | −2.1252 | 0.2300 | 1.55 | 56.1 | −11.08 | 3.3882 |
| S8 | Aspheric | −3.4021 | 1.3628 | | | | 0.0749 |
| S9 | Aspheric | −2.1188 | 0.7919 | 1.62 | 25.6 | 34.94 | −0.0422 |
| S10 | Aspheric | 6.6156 | 0.0300 | | | | 0.0000 |
| S11 | Spherical | Infinite | 0.2500 | 1.52 | 64.2 | | |
| S12 | Spherical | Infinite | 0.0300 | | | | |
| S13 | Spherical | Infinite | | | | | |

$TTL_T$ is a distance from the object-side surface S1 of the first lens E1 of the telephoto lens group to the imaging surface S13 of the telephoto lens group on the optical axis of the telephoto lens group, $ImgH_T$ is a half of a diagonal length of an effective pixel region on the imaging surface S13 of the telephoto lens group, Semi-$FOV_T$ is a half of a maximum field of view of the telephoto lens group, $Fno_T$ is an Fno of the telephoto lens group, and $f_T$ is a total effective focal length of the telephoto lens group.

In embodiment 1, both the object-side surface and an image-side surface of any lens in the first lens E1 to fifth lens E5 of the telephoto lens group are aspheric surfaces, and a surface type x of each aspheric lens may be defined through, but not limited to, the following aspheric surface formula:

$$x = \frac{ch^2}{1+\sqrt{1-(k+1)c^2h^2}} + \sum Aih^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a cone coefficient; and Ai is a correction coefficient of the i-th order of the aspheric surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S10 of the telephoto lens group according to embodiment 1.

TABLE 2

| Surface number | A4 | A6 | A8 | A10 | A12 | A14 | A16 | A18 | A20 |
|---|---|---|---|---|---|---|---|---|---|
| S1 | −5.8157E−03 | −1.1563E−02 | 2.4845E−02 | −4.0291E−02 | 3.8917E−02 | −2.3453E−02 | 8.4944E−03 | −1.6991E−03 | 1.4462E−04 |
| S2 | −5.3554E−02 | 7.1486E−02 | −8.9297E−02 | 7.7208E−02 | −3.9520E−02 | 1.0442E−02 | −5.8908E−04 | −3.3810E−04 | 5.9901E−05 |
| S3 | −2.0942E−02 | 6.8347E−02 | −8.1289E−02 | 2.5594E−03 | 8.3418E−02 | −8.2431E−02 | 3.6762E−02 | −8.0915E−03 | 7.0792E−04 |
| S4 | −1.2266E−02 | 1.0016E−01 | −1.8913E−01 | 3.1114E−01 | −4.9439E−01 | 5.9079E−01 | −4.2309E−01 | 1.6194E−01 | −2.5646E−02 |
| S5 | −1.0906E−01 | 5.9652E−02 | 3.8019E−02 | −1.7298E−01 | 2.5361E−01 | −1.7963E−01 | 6.7092E−02 | −1.0536E−02 | 1.0690E−04 |
| S6 | −1.4472E−01 | 1.8719E−01 | −1.2485E+00 | 5.4787E+00 | −1.5049E+01 | 2.5846E+01 | −2.6971E+01 | 1.5646E+01 | −3.8653E+00 |
| S7 | −2.1202E−02 | −4.2154E−01 | 2.8677E+00 | −1.2260E+01 | 3.1979E+01 | −5.2244E+01 | 5.1660E+01 | −2.8171E+01 | 6.4708E+00 |
| S8 | 3.7122E−02 | 1.2378E−01 | −4.0117E−01 | 1.0724E+00 | −1.7734E+00 | 1.7799E+00 | −1.0564E+00 | 3.3634E−01 | −4.3660E−02 |
| S9 | 1.9854E−03 | 1.4320E−01 | −2.0889E−01 | 1.7066E−01 | −8.6961E−02 | 2.8346E−02 | −5.7747E−03 | 6.7539E−04 | −3.4773E−05 |
| S10 | −1.2394E+00 | 2.2290E+00 | −2.4285E+00 | 1.7010E+00 | −7.8854E−01 | 2.4105E−01 | −4.6742E−02 | 5.2044E−03 | −2.5273E−04 |

Figure 2C:
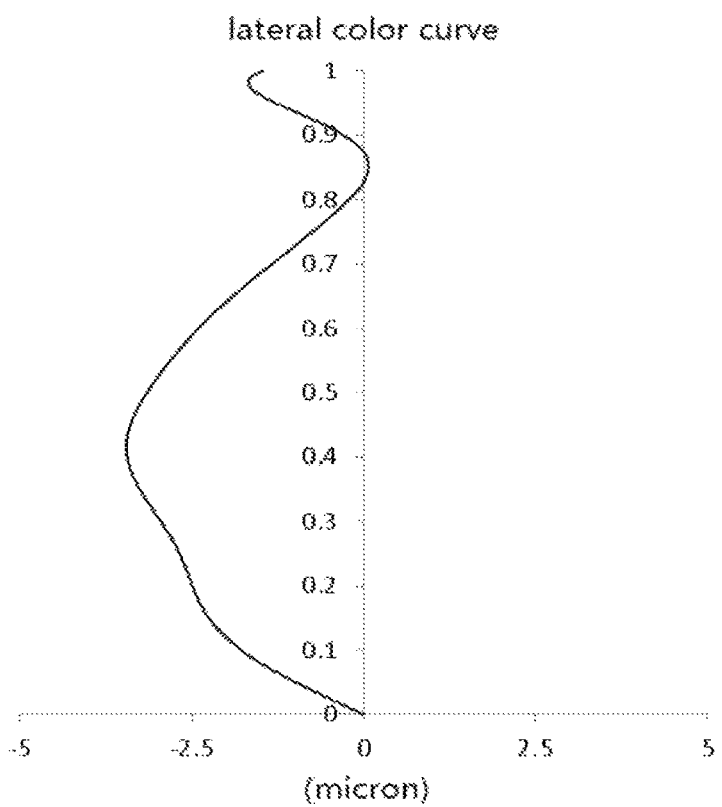

FIG. 2A shows an astigmatism curve of the telephoto lens group according to embodiment 1 to represent a meridian image surface curvature and a sagittal image surface curvature. FIG. 2B shows a distortion curve of the telephoto lens group according to embodiment 1 to represent distortion values corresponding to different image heights. FIG. 2C shows a lateral color curve of the telephoto lens group according to embodiment 1 to represent deviation of different image heights on the imaging surface after the light passes through the lens. According to FIG. 2A to FIG. 2C, it can be seen that high imaging quality of the telephoto lens group provided in embodiment 1 may be achieved.

Embodiment 2

Figure 3:
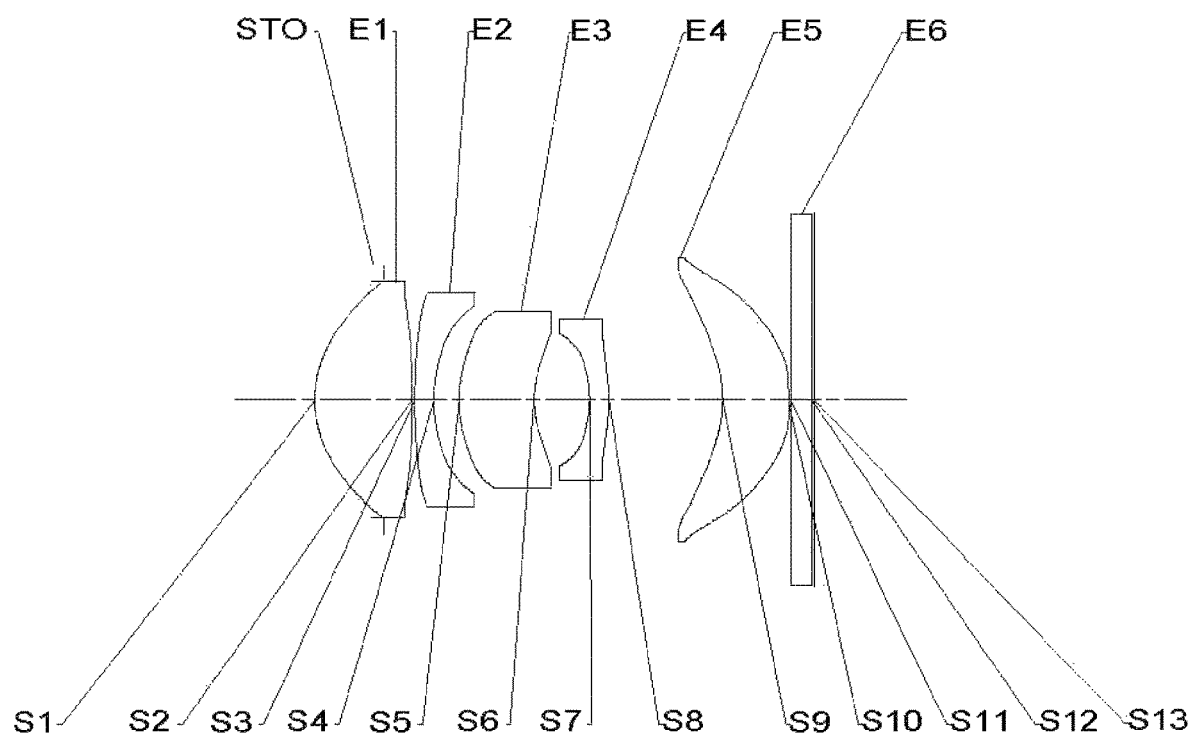
FIG. 3 is a structure diagram of a telephoto lens group according to embodiment 2 of the disclosure.

A telephoto lens group according to embodiment 2 of the disclosure will be described below with reference to FIG. 3 to FIG. 4C. In the embodiment and the following embodiments, part of descriptions similar to those about embodiment is omitted for simplicity. FIG. 3 is a structure diagram of a telephoto lens group according to embodiment 2 of the disclosure.

As shown in FIG. 3, the telephoto lens group sequentially includes, from an object side to an image side along an optical axis, a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a convex surface. The fifth lens E5 has a positive refractive power, an object-side surface S9 thereof is a concave surface, while an image-side surface S10 is a concave surface. The optical filter E6 has an object-side surface S11 and an image-side surface S12. Light from an object sequentially penetrates through each of the surfaces S1 to S12 and is finally imaged on the imaging surface S13.

Table 3 is a basic parameter table of the telephoto lens group of embodiment 2, and units of the curvature radius, the thickness and the focal length therein are all millimeter (mm). Table 4 shows high-order coefficients applied to each aspheric mirror surface in embodiment 2. A surface type of each aspheric surface may be defined by the formula (1) given in embodiment 1.

TABLE 3

Embodiment 2: $TTL_T = 6.00$ mm, $ImgH_T = 2.21$ mm, Semi-$FOV_T = 17.0°$, $Fno_T = 2.24$, $f_T = 7.11$ mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8222 | | | | |
| S1 | Aspheric | 1.8580 | 1.1689 | 1.55 | 55.9 | 3.23 | −0.0137 |
| S2 | Aspheric | −31.8665 | 0.0300 | | | | −99.0000 |
| S3 | Aspheric | 10.1844 | 0.2300 | 1.67 | 20.4 | −5.34 | 1.1686 |
| S4 | Aspheric | 2.6598 | 0.3030 | | | | 0.1395 |
| S5 | Aspheric | 2.0378 | 0.8985 | 1.51 | 56.23 | 126.93 | 0.4307 |
| S6 | Aspheric | 1.5703 | 0.6748 | | | | −0.5316 |
| S7 | Aspheric | −2.1252 | 0.2300 | 1.55 | 56.1 | −7.41 | 3.3882 |
| S8 | Aspheric | −3.4021 | 1.3628 | | | | 0.0749 |
| S9 | Aspheric | −2.1188 | 0.7919 | 1.62 | 25.6 | 16.93 | −0.0422 |
| S10 | Aspheric | 6.6156 | 0.0300 | | | | 0.0000 |
| S11 | Spherical | Infinite | 0.2500 | 1.52 | 64.2 | | |
| S12 | Spherical | Infinite | 0.0300 | | | | |
| S13 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −5.8157E−03 | −1.1563E−02 | 2.4845E−02 | −4.0291E−02 | 3.8917E−02 | −2.3453E−02 | 8.4944E−03 | −1.6991E−03 | 1.4462E−04 |
| S2 | −5.3554E−02 | 7.1486E−02 | −8.9297E−02 | 7.7208E−02 | −3.9520E−02 | 1.0442E−02 | −5.8908E−04 | −3.3810E−04 | 5.9901E−05 |
| S3 | −2.0942E−02 | 6.8347E−02 | −8.1289E−02 | 2.5594E−03 | 8.3418E−02 | −8.2431E−02 | 3.6762E−02 | −8.0915E−03 | 7.0792E−04 |
| S4 | −1.2266E−02 | 1.0016E−01 | −1.8913E−01 | 3.1114E−02 | −4.9439E−01 | 5.9079E−01 | −4.2309E−01 | 1.6194E−01 | −2.5646E−02 |
| S5 | −1.0906E−01 | 5.9652E−02 | 3.8019E−02 | −1.7298E−01 | 2.5361E−01 | −1.7963E−01 | 6.7092E−02 | −1.0536E−02 | 1.0690E−04 |
| S6 | −1.4472E−01 | 1.8719E−01 | −1.2485E+00 | 5.4787E+00 | −1.5049E+01 | 2.5846E+01 | −2.6971E+01 | 1.5646E+01 | −3.8653E+00 |
| S7 | −2.1202E−02 | −4.2154E−01 | 2.8677E+00 | −1.2260E+01 | 3.1979E+01 | −5.2244E+01 | 5.1660E+01 | −2.8171E+01 | 6.4708E+00 |
| S8 | 3.7122E−02 | 1.2378E−01 | −4.0117E−01 | 1.0724E+00 | −1.7734E+00 | 1.7799E+00 | −1.0564E+00 | 3.3634E−01 | −4.3660E−02 |
| S9 | 1.9854E−03 | 1.4320E−01 | −2.0889E−01 | 1.7066E−01 | −8.6961E−02 | 2.8346E−02 | −5.7747E−03 | 6.7539E−04 | −3.4773E−05 |
| S10 | −1.2394E+00 | 2.2290E+00 | −2.4285E+00 | 1.7010E+00 | −7.8854E−01 | 2.4105E−01 | −4.6742E−02 | 5.2044E−03 | −2.5273E−04 |

Figure 4A:
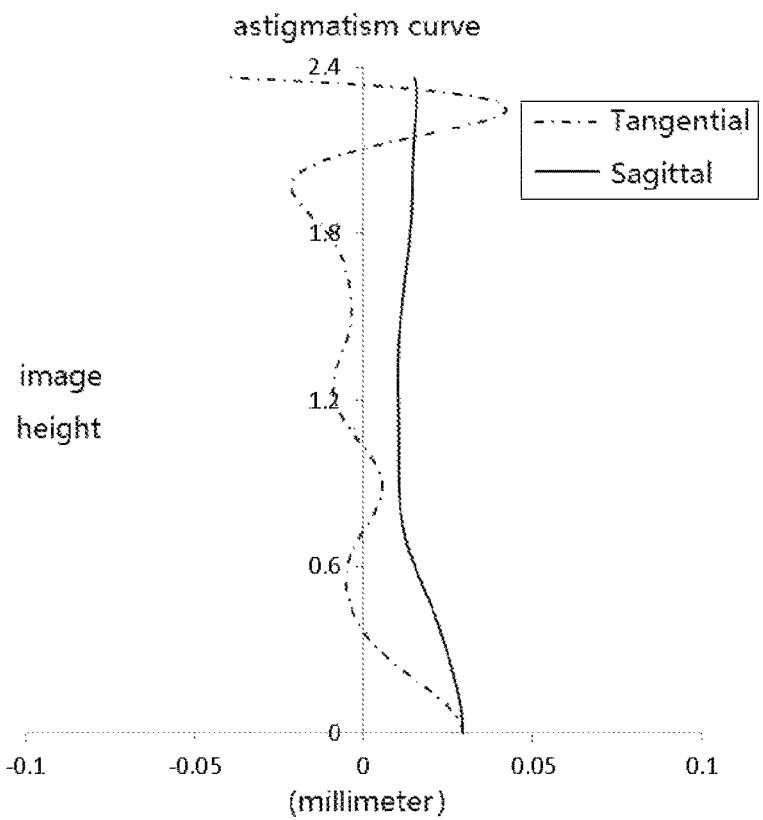
FIG. 4A to FIG. 4C show an astigmatism curve, a distortion curve and a lateral color curve of a telephoto lens group according to embodiment 2 respectively.
Figure 4B:
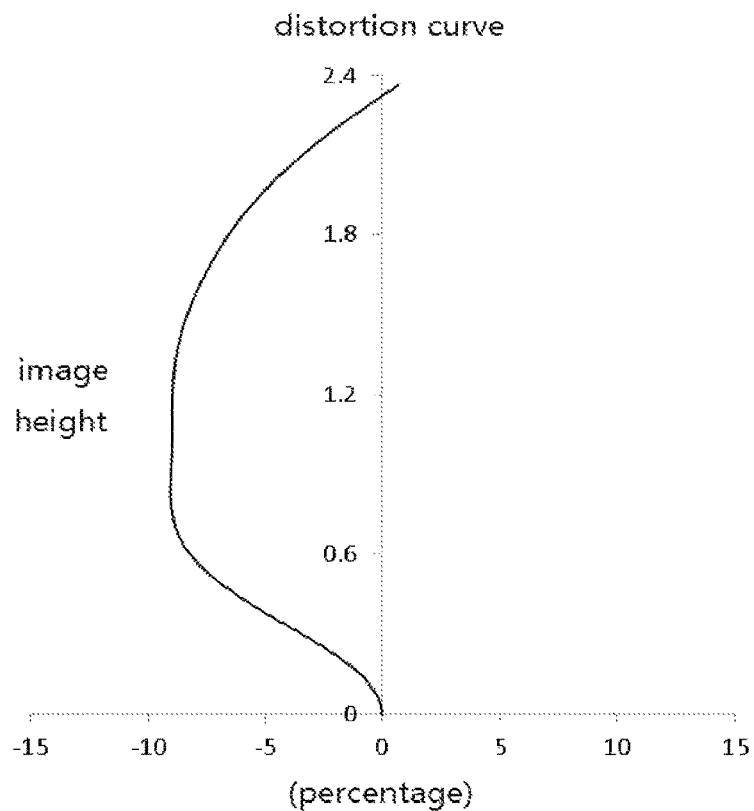
Figure 4C:
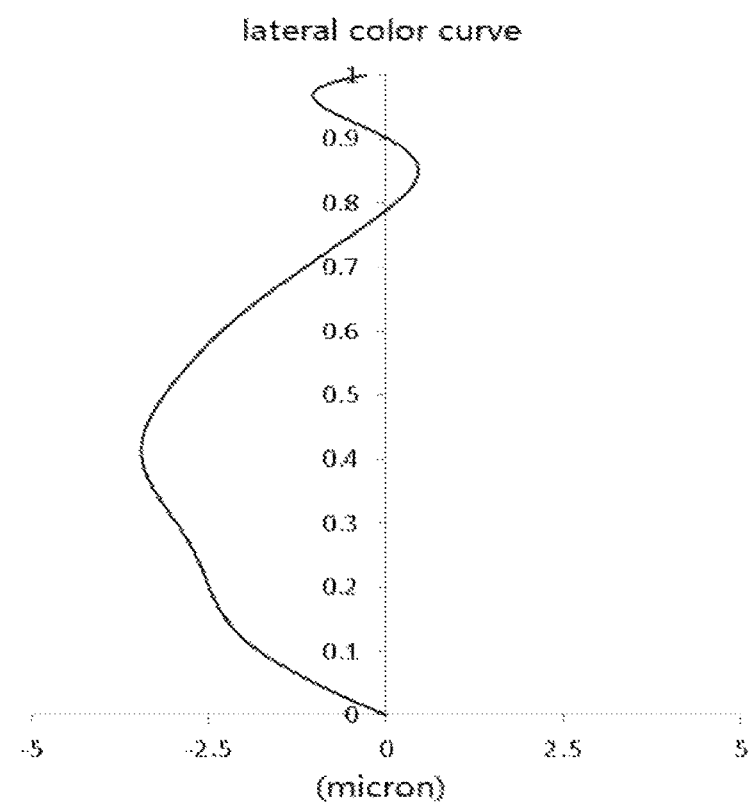

FIG. 4A shows an astigmatism curve of the telephoto lens group according to embodiment 2 to represent a meridian image surface curvature and a sagittal image surface curvature. FIG. 4B shows a distortion curve of the telephoto lens group according to embodiment 2 to represent distortion values corresponding to different image heights. FIG. 4C shows a lateral color curve of the telephoto lens group according to embodiment 2 to represent deviation of different image heights on the imaging surface after the light passes through the lens. According to FIG. 4A to FIG. 4C, it can be seen that high imaging quality of the telephoto lens group provided in embodiment 2 may be achieved.

Embodiment 3

Figure 5:
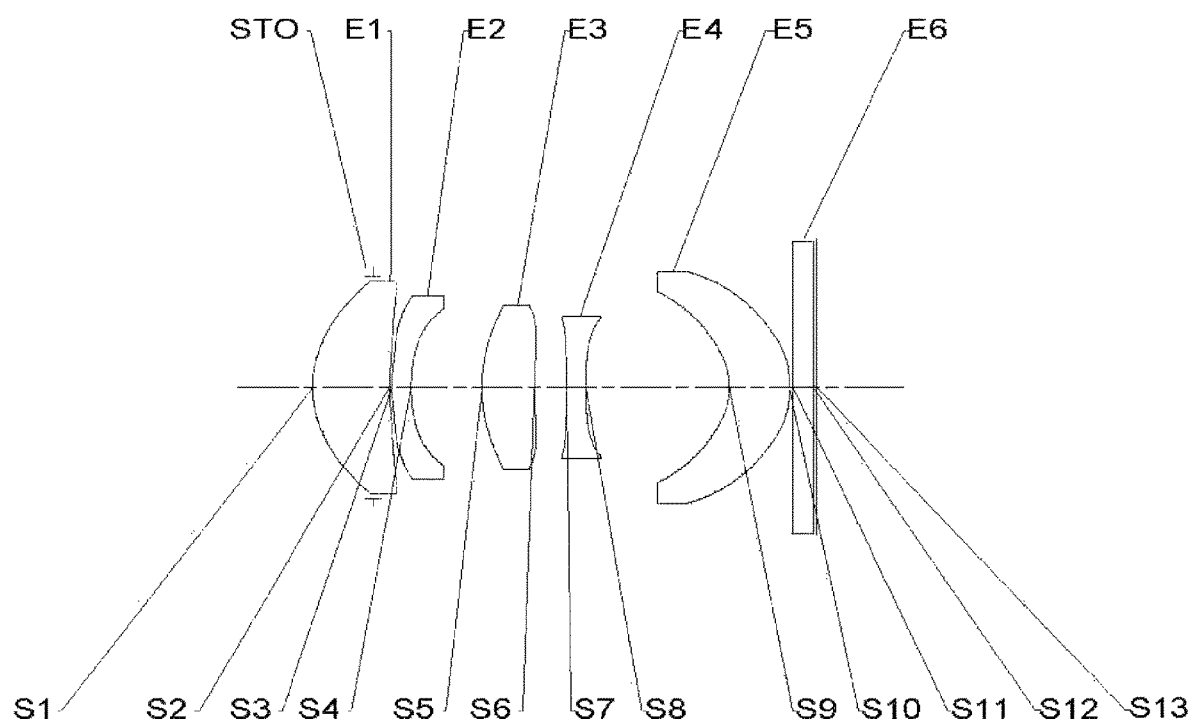
FIG. 5 is a structure diagram of a telephoto lens group according to embodiment 3 of the disclosure.

A telephoto lens group according to embodiment 3 of the disclosure will be described below with reference to FIG. 5 to FIG. 6C. FIG. 5 is a structure diagram of a telephoto lens group according to embodiment 3 of the disclosure.

As shown in FIG. 5, the telephoto lens group sequentially includes, from an object side to an image side along an optical axis, a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a concave surface. The fifth lens E5 has a negative refractive power, an object-side surface S9 thereof is a concave surface, while an image-side surface S10 is a convex surface. The optical filter E6 has an object-side surface S11 and an image-side surface S12. Light from an object sequentially penetrates through each of the surfaces S1 to S12 and is finally imaged on the imaging surface S13.

Table 5 is a basic parameter table of the telephoto lens group of embodiment 3, and units of the curvature radius, the thickness and the focal length therein are all millimeter (mm). Table 6 shows high-order coefficients applied to each aspheric mirror surface in embodiment 3. A surface type of each aspheric surface may be defined by the formula (1) given in embodiment 1.

TABLE 5

Embodiment 3: $TTL_T$ = 6.10 mm, $ImgH_T$ = 2.06 mm, Semi-$FOV_T$ = 17.0°, $Fno_T$ = 2.52, $f_T$ = 7.49 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7334 | | | | |
| S1 | Aspheric | 1.8082 | 0.9274 | 1.55 | 55.9 | 7.54 | −0.2107 |
| S2 | Aspheric | 2.6429 | 0.0305 | | | | 0.0000 |
| S3 | Aspheric | 2.7027 | 0.2300 | 1.67 | 20.4 | 200.44 | 0.0000 |
| S4 | Aspheric | 2.6648 | 0.8574 | | | | 0.0000 |
| S5 | Aspheric | 2.5058 | 0.6340 | 1.51 | 56.23 | 8.19 | 0.6719 |
| S6 | Aspheric | 5.7061 | 0.3893 | | | | 0.0000 |
| S7 | Aspheric | −8.5665 | 0.2346 | 1.55 | 56.1 | −10.02 | 57.2672 |
| S8 | Aspheric | 15.2986 | 1.7360 | | | | −24.9410 |
| S9 | Aspheric | −1.1383 | 0.7212 | 1.62 | 25.6 | −2.45 | −1.0000 |
| S10 | Aspheric | 5.6857 | 0.0451 | | | | 4.5056 |
| S11 | Spherical | Infinite | 0.2500 | 1.52 | 64.2 | | |
| S12 | Spherical | Infinite | 0.0446 | | | | |
| S13 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 3.6889E−03 | −2.4652E−02 | 7.2007E−02 | −1.1752E−01 | 1.0817E−01 | −5.8867E−02 | 1.8720E−02 | −3.2218E−03 | 2.3221 E−04 |
| S2 | −4.3878E−01 | 5.9723E−01 | −6.1936E−01 | 6.8893E−01 | −6.6371E−01 | 4.2034E−01 | −1.5816E−01 | 3.2210E−02 | −2.7434E−03 |
| S3 | −3.7406E−01 | 6.4942E−01 | −8.2833E−01 | 1.0797E+00 | −1.0500E+00 | 6.2220E−01 | −2.0706E−01 | 3.4070E−02 | −1.9084E−03 |
| S4 | −8.3069E−03 | 3.1194E−01 | −8.5913E−01 | 1.8522E+00 | −2.4694E+00 | 2.0362E+00 | −1.0194E+00 | 2.8500E−01 | −3.4311E−02 |
| S5 | −1.6012E−02 | −3.9464E−02 | 2.0154E−01 | −5.6718E−01 | 9.9508E−01 | −1.0857E+00 | 7.1339E−01 | −2.5889E−01 | 3.9771E−02 |
| S6 | −8.0637E−02 | 1.0254E−02 | −2.2387E−01 | 5.8393E−01 | −8.6187E−01 | 8.0040E−01 | −4.5066E−01 | 1.3819E−01 | −1.7469E−02 |
| S7 | 1.5619E−01 | −3.5111E−01 | 9.0120E−01 | −2.6814E+00 | 5.3276E+00 | −6.6967E+00 | 5.2412E+00 | −2.3312E+00 | 4.5051E−01 |
| S8 | 2.2686E−01 | −5.9996E−02 | −2.8845E−01 | 1.0798E+00 | −2.2788E+00 | 3.1600E+00 | −2.7250E+00 | 1.3285E+00 | −2.7917E−01 |
| S9 | −1.2738E−01 | 5.1038E−01 | −1.0278E+00 | 1.3384E+00 | −1.1602E+00 | 6.2765E−01 | −1.9069E−01 | 2.4827E−02 | −4.0045E−05 |
| S10 | −1.3879E+00 | 3.4227E+00 | −5.1157E+00 | 4.9742E+00 | −3.2175E+00 | 1.3722E+00 | −3.7112E−01 | 5.7771E−02 | −3.9542E−03 |

Figure 6A:
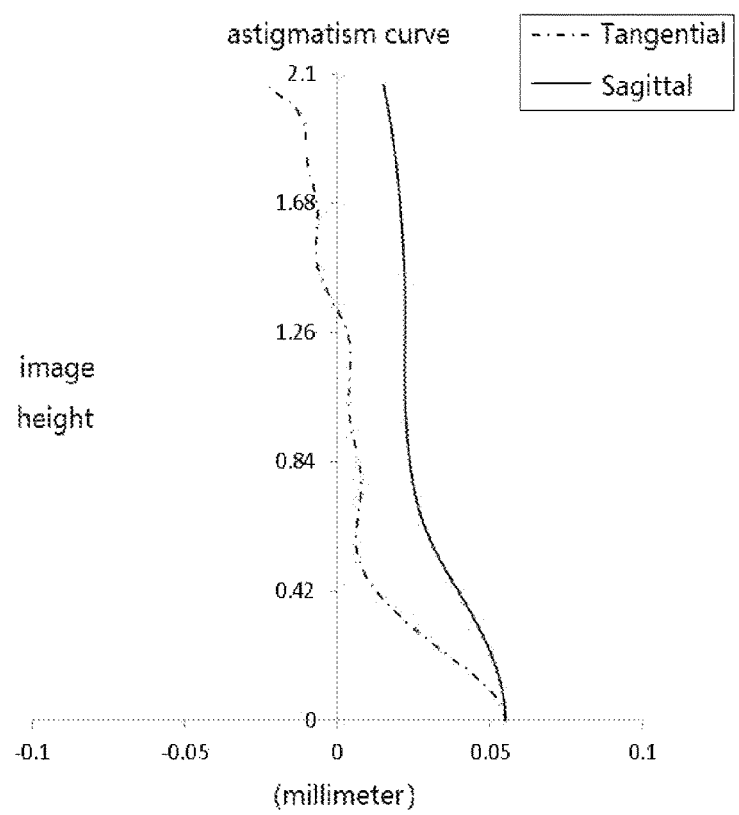
FIG. 6A to FIG. 6C show an astigmatism curve, a distortion curve and a lateral color curve of a telephoto lens group according to embodiment 3 respectively.
Figure 6B:
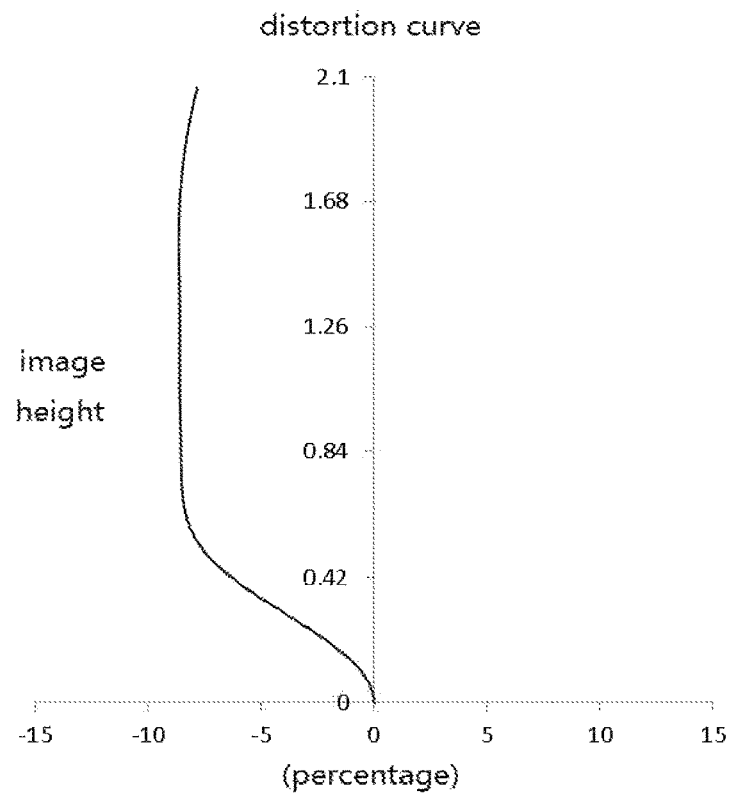
Figure 6C:
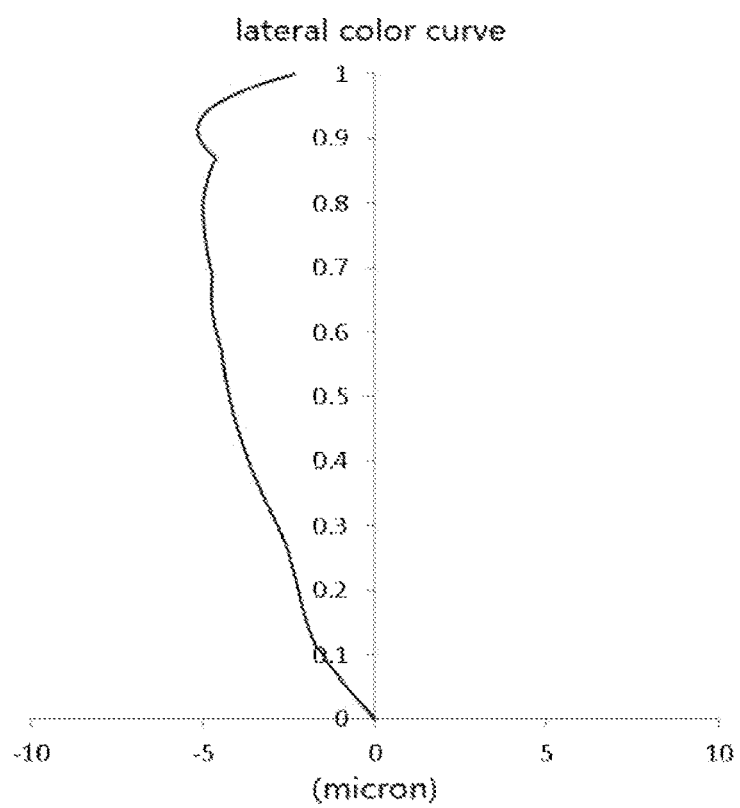

FIG. 6A shows an astigmatism curve of the telephoto lens group according to embodiment 3 to represent a meridian image surface curvature and a sagittal image surface curvature. FIG. 6B shows a distortion curve of the telephoto lens group according to embodiment 3 to represent distortion values corresponding to different image heights. FIG. 6C shows a lateral color curve of the telephoto lens group according to embodiment 3 to represent deviation of different image heights on the imaging surface after the light passes through the lens. According to FIG. 6A to FIG. 6C, it can be seen that high imaging quality of the telephoto lens group provided in embodiment 3 may be achieved.

(2) Wide-Angle Lens Group

The wide-angle lens group according to the disclosure may include, for example, five lenses with refractive power, i.e., a first lens, a second lens, a third lens, a fourth lens and a fifth lens. The five lenses are sequentially arranged from an object side to an image side along an optical axis. In the first lens to fifth lens of the wide-angle lens group, there may be an air space between any two adjacent lenses.

In the exemplary implementation mode, in the wide-angle lens group, the first lens may have a negative refractive power; the second lens may have a positive refractive power, and an object-side surface thereof may be a convex surface; the third lens has a positive refractive power or a negative refractive power; the fourth lens has a positive refractive power or a negative refractive power, and an image-side surface thereof may be a concave surface; and the fifth lens may have a positive refractive power.

In the exemplary implementation mode, both an object-side surface and an image-side surface of the first lens of the wide-angle lens group may be concave surfaces.

In the exemplary implementation mode, an object-side surface of the third lens of the wide-angle lens group may be a concave surface, while an image-side surface may be a convex surface.

In the exemplary implementation mode, an object-side surface of the fourth lens of the wide-angle lens group may be a convex surface.

In the exemplary implementation mode, both an object-side surface and an image-side surface of the fifth lens of the wide-angle lens group may be convex surfaces.

In the exemplary implementation mode, the combined zoom dual-camera lens assembly of the disclosure may meet a conditional expression Semi-FOV$_W$>63.0°, wherein Semi-FOV$_W$ is a half of a maximum field of view of the wide-angle lens group. More specifically, Semi-FOV$_W$ may further meet 63.0°<Semi-FOV$_W$<70.0°, for example, 63.1°≤Semi-FOV$_W$≤66.7°. The conditional expression Semi-FOV$_W$>63.0° is met, so that a larger field of view of the wide-angle lens group during imaging may be ensured effectively.

In the exemplary implementation mode, the combined zoom dual-camera lens assembly of the disclosure may meet a conditional expression 4.00<(10×CT2$_W$)/ImgH$_W$<6.00, wherein ImgH$_W$ is a half of a diagonal length of an effective pixel region on an imaging surface of the wide-angle lens group, and CT2$_W$ is a center thickness of the second lens of the wide-angle lens group on the optical axis of the wide-angle lens group. More specifically, CT2$_W$ and ImgH$_W$ may further meet 4.38≤(10×CT2$_W$)/ImgH$_W$≤5.88. The conditional expression 4.00<(10×CT2$_W$)/ImgH$_W$<6.00 is met, so that a field curvature generated by the second lens of the wide-angle lens group may be controlled reasonably, and meanwhile, miniaturization of the whole wide-angle lens group is also facilitated.

In the exemplary implementation mode, the wide-angle lens group may further include at least one diaphragm. The diaphragm may be arranged at a proper position as required, for example, arranged between the third lens and the fourth lens. Optionally, the wide-angle lens group may further include an optical filter configured to correct a chromatic aberration and/or protective glass configured to protect a photosensitive element on the imaging surface.

The wide-angle lens group according to the implementation mode of the disclosure may adopt multiple lenses, for example, the abovementioned five lenses. The refractive power and surface types of each lens, the center thickness of each lens, on-axis distances between the lenses and the like may be reasonably configured to effectively reduce the size of the wide-angle lens group, reduce the sensitivity of the wide-angle lens group, improve the machinability of the wide-angle lens group and ensure that the wide-angle lens group is more favorable for production and machining and may be applied to a portable combined zoom dual-camera lens assembly.

In the implementation mode of the disclosure, at least one of mirror surfaces of each lens in the wide-angle lens group is an aspheric mirror surface, namely at least one of the object-side surface and an image-side surface of each lens in the first lens, the second lens, the third lens, the fourth lens and the fifth lens is an aspheric mirror surface. Optionally, both the object-side surface and an image-side surface of each lens in the first lens, second lens, third lens, fourth lens and fifth lens of the wide-angle lens group are aspheric mirror surfaces.

Multiple embodiments of the wide-angle lens group according to the disclosure may further be described below with reference to FIG. 7 to FIG. 12C.

Embodiment 4

Figure 7:
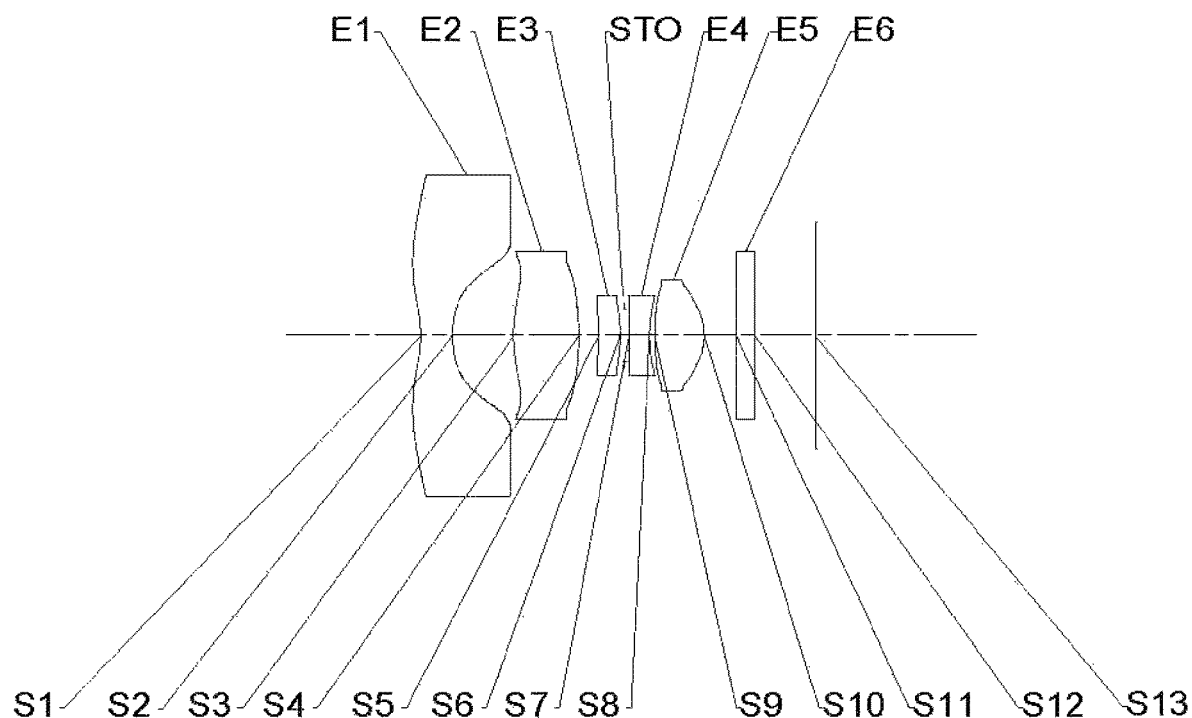
FIG. 7 is a structure diagram of a wide-angle lens group according to embodiment 4 of the disclosure.

A wide-angle lens group according to embodiment 4 of the disclosure will be described below with reference to FIG. 7 to FIG. 8C. FIG. 7 is a structure diagram of a wide-angle lens group according to embodiment 4 of the disclosure.

As shown in FIG. 7, the wide-angle lens group sequentially includes, from an object side to an image side along an optical axis, a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a concave surface, while an image-side surface S6 is a convex surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The optical filter E6 has an object-side surface S11 and an image-side surface S12. Light from an object sequentially penetrates through each of the surfaces S1 to S12 and is finally imaged on the imaging surface S13.

Table 7 is a basic parameter table of the wide-angle lens group of embodiment 4, and units of the curvature radius, the thickness and the focal length therein are all millimeter (mm). Table 8 shows high-order coefficients applied to each aspheric mirror surface in embodiment 4. A surface type of each aspheric surface may be defined by the formula (1) given in embodiment 1.

TABLE 7

Embodiment 4: TTL$_W$ = 4.60 mm, ImgH$_W$ = 1.35 mm, Semi-FOV$_W$ = 63.1°, Fno$_{TW}$= 2.06, f$_W$ = 0.72 mm

| Surface number | Surface type | Curvature radius | Thickness | Material Refractive index | Abbe number | Focal length | Conic coefficient |
|---|---|---|---|---|---|---|---|
| OBJ | Spherical | Infinite | 404.0000 | | | | |
| S1 | Aspheric | −1.3858 | 0.3642 | 1.55 | 56.1 | −1.20 | −0.9648 |
| S2 | Aspheric | 1.3482 | 0.7125 | | | | 0.0265 |
| S3 | Aspheric | 1.8232 | 0.7588 | 1.67 | 20.4 | 2.10 | −0.0985 |
| S4 | Aspheric | −5.0008 | 0.2369 | | | | −0.6415 |
| S5 | Aspheric | −4.3483 | 0.2570 | 1.55 | 56.1 | 5.56 | 23.4052 |
| S6 | Aspheric | −1.8242 | 0.0500 | | | | −37.0769 |
| STO | Spherical | Infinite | 0.0500 | | | | |
| S7 | Aspheric | 5.2155 | 0.2400 | 1.67 | 20.4 | −2.33 | 14.2798 |
| S8 | Aspheric | 1.1718 | 0.0611 | | | | −0.0143 |
| S9 | Aspheric | 1.7722 | 0.5785 | 1.54 | 55.9 | 1.03 | 0.5443 |
| S10 | Aspheric | −0.7152 | 0.3725 | | | | −0.1291 |
| S11 | Spherical | Infinite | 0.2121 | 1.52 | 64.2 | | |

TABLE 7-continued

Embodiment 4: $TTL_W$ = 4.60 mm, $ImgH_W$ = 1.35 mm, Semi-$FOV_W$ = 63.1°, $Fno_{TW}$ = 2.06, $f_W$ = 0.72 mm

| Surface number | Surface type | Curvature radius | Thickness | Material Refractive index | Abbe number | Focal length | Conic coefficient |
|---|---|---|---|---|---|---|---|
| S12 | Spherical | Infinite | 0.7064 | | | | |
| S13 | Spherical | Infinite | | | | | |

$TTL_W$ is a distance from the object-side surface S1 of the first lens E1 of the wide-angle lens group to the imaging surface S13 of the wide-angle lens group on the optical axis of the wide-angle lens group, $ImgH_W$ is a half of a diagonal length of an effective pixel region on the imaging surface S13 of the wide-angle lens group, Semi-$FOV_W$ is a half of a maximum field of view of the wide-angle lens group, $Fno_W$ is an Fno of the wide-angle lens group, and $f_W$ is a total effective focal length of the wide-angle lens group.

TABLE 8

| Surface number | A4 | A6 | A8 | A10 | A12 | A14 | A16 | A18 | A20 |
|---|---|---|---|---|---|---|---|---|---|
| S1 | 6.0155E−01 | −6.2684E−01 | 4.8628E−01 | −2.6944E−01 | 1.0377E−01 | −2.7074E−02 | 4.5619E−03 | −4.4775E−04 | 1.9435E−05 |
| S2 | 3.4024E−01 | −7.7726E−01 | 9.5600E+00 | −4.2534E+01 | 1.0004E+02 | −1.3641E+02 | 1.0680E+02 | −4.4498E+01 | 7.6593E+00 |
| S3 | −3.5672E−01 | 8.8429E−01 | −2.2716E+00 | 3.2661E+00 | −1.1050E+00 | −7.8568E+00 | 1.5785E+01 | −1.1715E+01 | 3.1070E+00 |
| S4 | −3.3238E−01 | 2.4656E+00 | −1.4485E+01 | 5.3513E+01 | −1.2741E+02 | 1.9450E+02 | −1.8225E+02 | 9.4510E+01 | −2.0579E+01 |
| S5 | −3.6730E−01 | 1.7570E+01 | −4.9639E+02 | 8.8504E+03 | −9.4833E+04 | 6.1870E+05 | −2.4074E+06 | 5.1336E+06 | −4.6186E+06 |
| S6 | −1.0757E+00 | 6.5385E+00 | 4.2644E+02 | −1.6380E+04 | 3.0410E+05 | −3.2744E+06 | 2.0667E+07 | −7.0921E+07 | 1.0198E+08 |
| S7 | −1.6550E+00 | 2.5316E+01 | −4.6653E+02 | 8.9765E+03 | −1.2465E+05 | 1.0748E+06 | −5.4034E+06 | 1.4396E+07 | −1.5621E+07 |
| S8 | −2.7899E+00 | 2.8340E+01 | −2.5694E+02 | 1.9180E+03 | −1.0058E+04 | 3.0797E+04 | −3.8922E+04 | −2.6578E+04 | 8.6878E+04 |
| S9 | −1.9293E+00 | 1.6297E+01 | −1.1079E+02 | 6.9340E+02 | −3.3002E+03 | 1.0616E+04 | −2.1567E+04 | 2.5034E+04 | −1.2697E+04 |
| S10 | 3.3039E−01 | −1.1845E+00 | 2.4899E+01 | −2.1954E+02 | 1.2199E+03 | −4.1763E+03 | 8.6476E+03 | −9.7970E+03 | 4.6381E+03 |

Figure 8A:
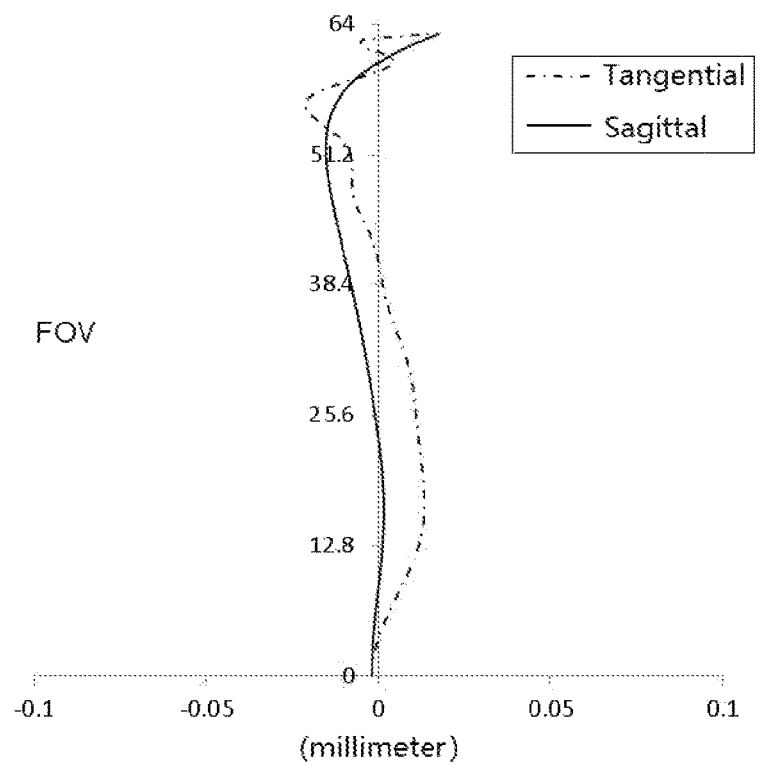
FIG. 8A to FIG. 8C show an astigmatism curve, a distortion curve and a lateral color curve of a wide-angle lens group according to embodiment 4 respectively.
Figure 8B:
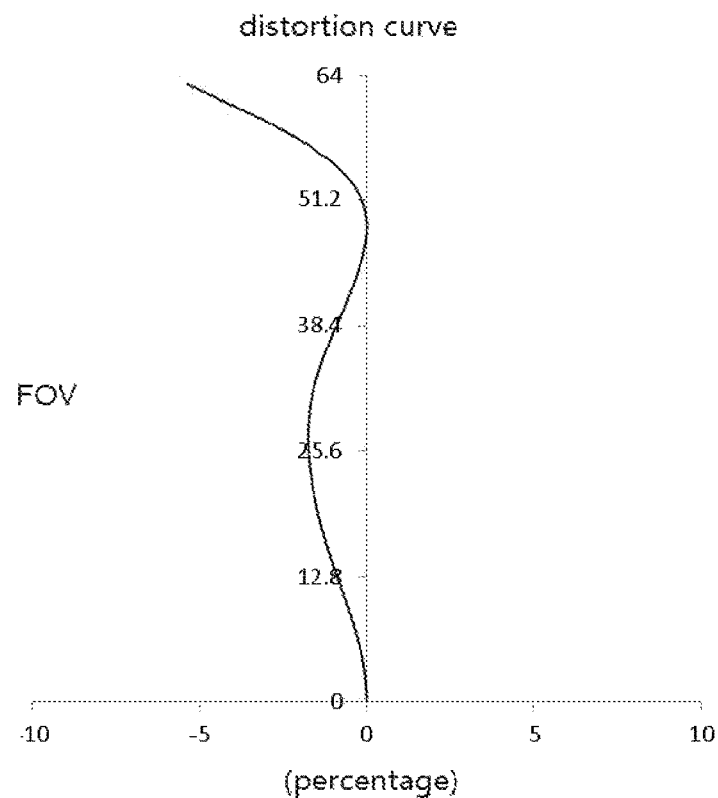
Figure 8C:
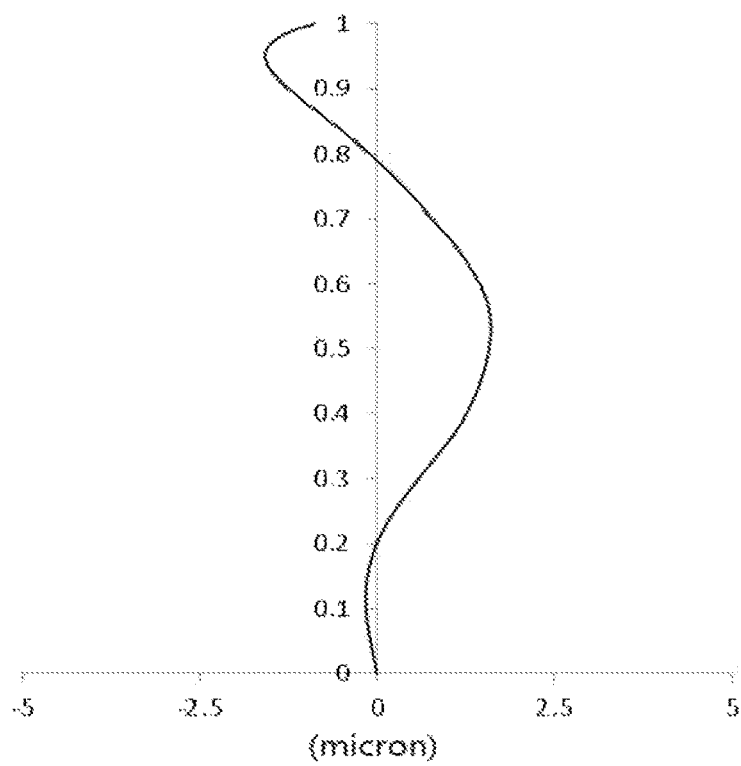

FIG. 8A shows an astigmatism curve of the wide-angle lens group according to embodiment 4 to represent a meridian image surface curvature and a sagittal image surface curvature. FIG. 8B illustrates a distortion curve of the wide-angle lens group according to embodiment 4 to represent a distortion value under different fields of view. FIG. 8C shows a lateral color curve of the wide-angle lens group according to embodiment 4 to represent deviation of different image heights on the imaging surface after the light passes through the lens. According to FIG. 8A to FIG. 8C, it can be seen that high imaging quality of the wide-angle lens group provided in embodiment 4 may be achieved.

Embodiment 5

Figure 9:
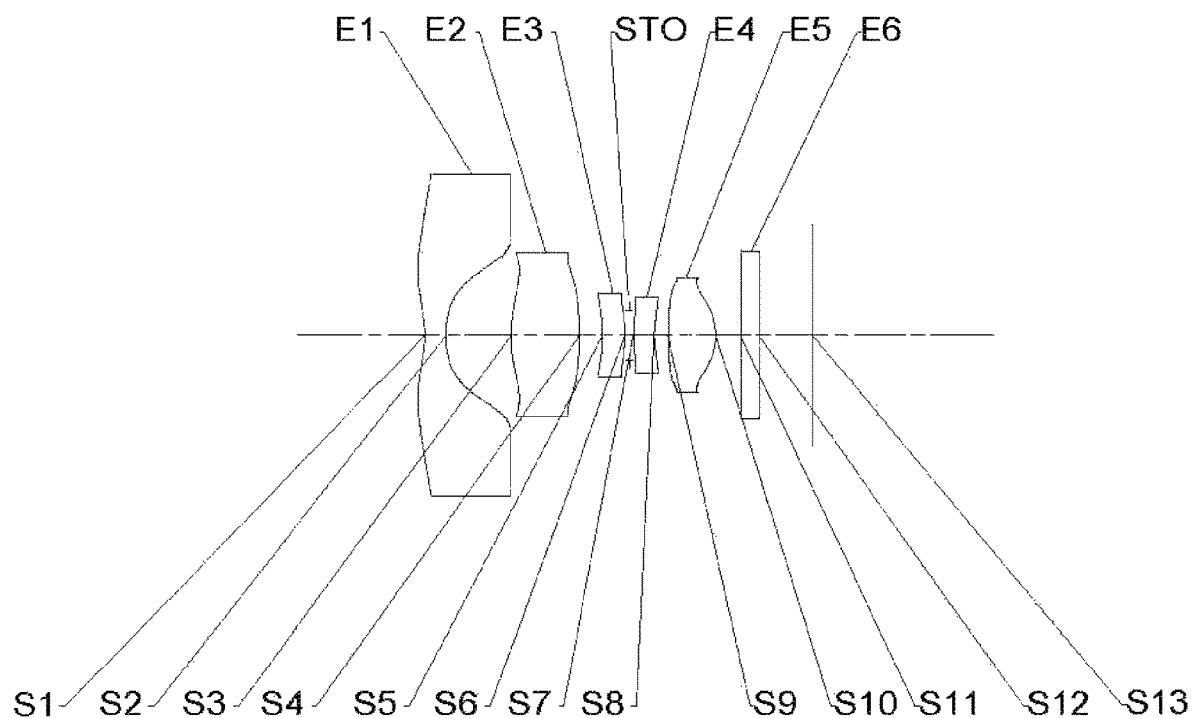
FIG. 9 is a structure diagram of a wide-angle lens group according to embodiment 5 of the disclosure.

A wide-angle lens group according to embodiment 5 of the disclosure will be described below with reference to FIG. 9 to FIG. 10C. FIG. 9 is a structure diagram of a wide-angle lens group according to embodiment 5 of the disclosure.

As shown in FIG. 9, the wide-angle lens group sequentially includes, from an object side to an image side along an optical axis, a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a concave surface, while an image-side surface S6 is a convex surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The optical filter E6 has an object-side surface S11 and an image-side surface S12. Light from an object sequentially penetrates through each of the surfaces S1 to S12 and is finally imaged on the imaging surface S13.

Table 9 is a basic parameter table of the wide-angle lens group of embodiment 5, and units of the curvature radius, the thickness and the focal length therein are all millimeter (mm). Table 10 shows high-order coefficients applied to each aspheric mirror surface in embodiment 5. A surface type of each aspheric surface may be defined by the formula (1) given in embodiment 1.

TABLE 9

Embodiment 5: $TTL_W$ = 4.50 mm, $ImgH_W$ = 1.35 mm, $Semi\text{-}FOV_T$ = 65.1°, $Fno_W$ = 2.07, $f_W$ = 0.66 mm

| Surface number | Surface type | Curvature radius | Thickness | Material Refractive index | Abbe number | Focal length | Conic coefficient |
|---|---|---|---|---|---|---|---|
| OBJ | Spherical | Infinite | 404.0000 | | | | |
| S1 | Aspheric | −1.3988 | 0.2400 | 1.55 | 56.1 | −1.19 | −0.9088 |
| S2 | Aspheric | 1.2940 | 0.7569 | | | | 0.0652 |
| S3 | Aspheric | 1.8212 | 0.7934 | 1.67 | 20.4 | 2.10 | 0.2043 |
| S4 | Aspheric | −4.9885 | 0.2702 | | | | 3.1980 |
| S5 | Aspheric | −2.7908 | 0.2627 | 1.55 | 56.1 | −195.73 | 22.1647 |
| S6 | Aspheric | −2.9609 | 0.0500 | | | | 43.1719 |
| STO | Spherical | Infinite | 0.0500 | | | | |
| S7 | Aspheric | 1.3141 | 0.2407 | 1.67 | 20.4 | 201.29 | −22.5293 |
| S8 | Aspheric | 1.2299 | 0.1588 | | | | −0.7248 |
| S9 | Aspheric | 2.8197 | 0.5526 | 1.54 | 55.9 | 1.14 | 11.7497 |
| S10 | Aspheric | −0.7253 | 0.2887 | | | | −0.1409 |
| S11 | Spherical | Infinite | 0.2121 | 1.52 | 64.2 | | |
| S12 | Spherical | Infinite | 0.6226 | | | | |
| S13 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 6.5119E−01 | −6.6737E−01 | 4.9540E−01 | −2.6323E−01 | 9.7613E−02 | −2.4518E−02 | 3.9658E−03 | −3.7181E−04 | 1.5307E−05 |
| S2 | 3.7792E−01 | −1.0715E+00 | 1.0595E+01 | −4.0376E+01 | 8.3612E+01 | −1.0325E+02 | 7.4636E+01 | −2.9003E+01 | 4.6731E+00 |
| S3 | −3.4732E−01 | 9.5981E−01 | −2.3267E+00 | 1.5388E+00 | 6.0047E+00 | −1.9583E+01 | 2.5218E+01 | −1.5351E+01 | 3.6366E+00 |
| S4 | −2.8703E−01 | 1.2621E+00 | −5.6391E+00 | 1.7330E+01 | −3.4437E+01 | 4.2572E+01 | −2.9773E+01 | 9.0726E+00 | −1.1113E−01 |
| S5 | −2.8377E−01 | −1.0980E+00 | 8.5469E+01 | −1.0283E+03 | 7.2889E+03 | −3.3342E+04 | 9.6915E+04 | −1.6321 E+05 | 1.2237E+05 |
| S6 | −1.9037E+00 | 1.2426E+01 | 2.6323E+02 | −8.7147E+03 | 1.3743E+05 | −1.3174E+06 | 7.6485E+06 | −2.4591 E+07 | 3.3618E+07 |
| S7 | −2.0625E+00 | 4.7769E+01 | −1.6653E+03 | 4.1939E+04 | −6.7108E+05 | 6.7375E+06 | −4.1170E+07 | 1.3993E+08 | −2.0276E+08 |
| S8 | −1.9212E+00 | 1.1805E+01 | −7.7689E+01 | 3.4286E+02 | 8.0076E+02 | −2.2161E+04 | 1.2680E+05 | −3.2183E+05 | 3.1390E+05 |
| S9 | −9.8031E−01 | 8.3824E+00 | −6.4655E+01 | 4.1916E+02 | −1.7688E+03 | 4.6801E+03 | −7.5806E+03 | 6.9020E+03 | −2.7120E+03 |
| S10 | 3.3109E−01 | 4.6224E−03 | 8.5742E+00 | −6.0407E+01 | 3.1029E+02 | −1.0382E+03 | 2.2774E+03 | −2.8331 E+03 | 1.4724E+03 |

Figure 10A:
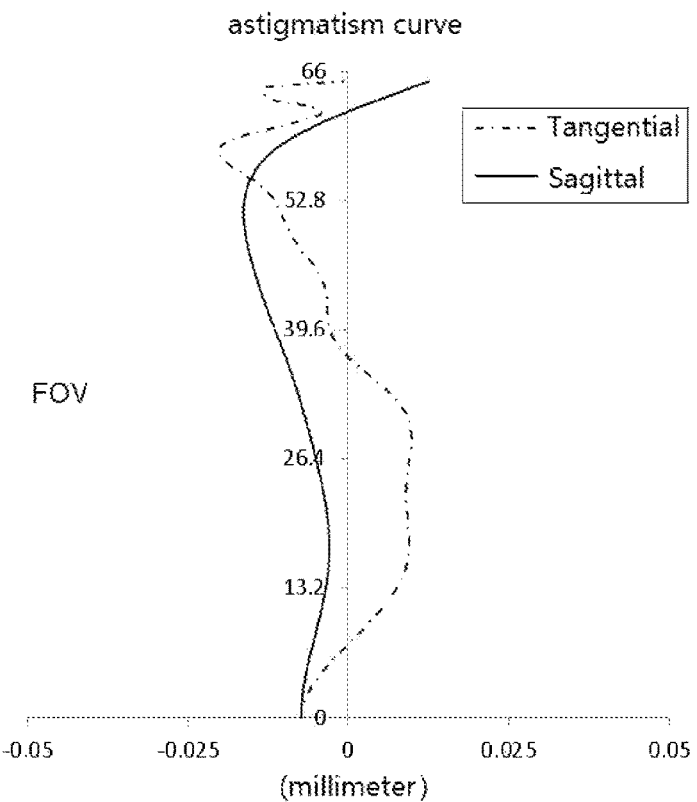
FIG. 10A to FIG. 10C show an astigmatism curve, a distortion curve and a lateral color curve of a wide-angle lens group according to embodiment 5 respectively.
Figure 10B:
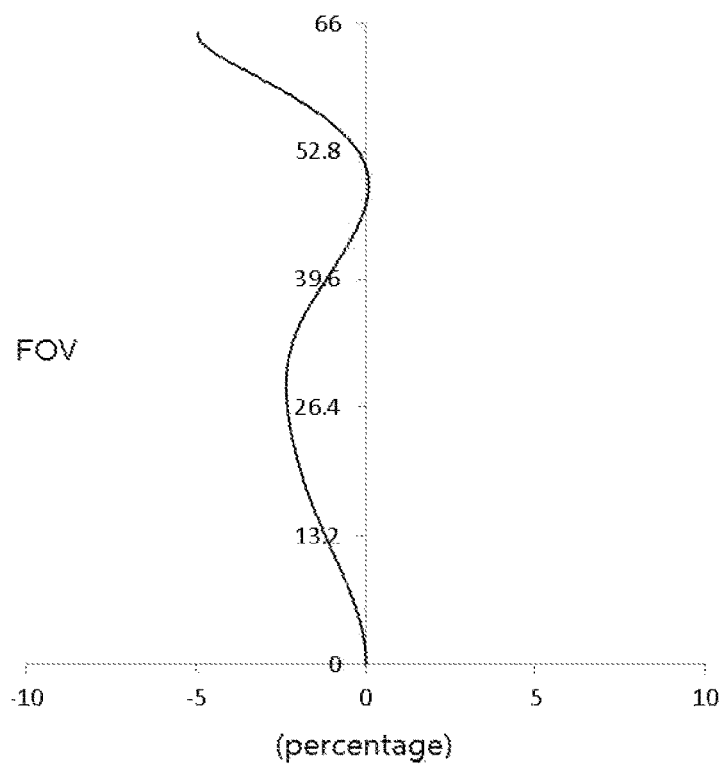
Figure 10C:
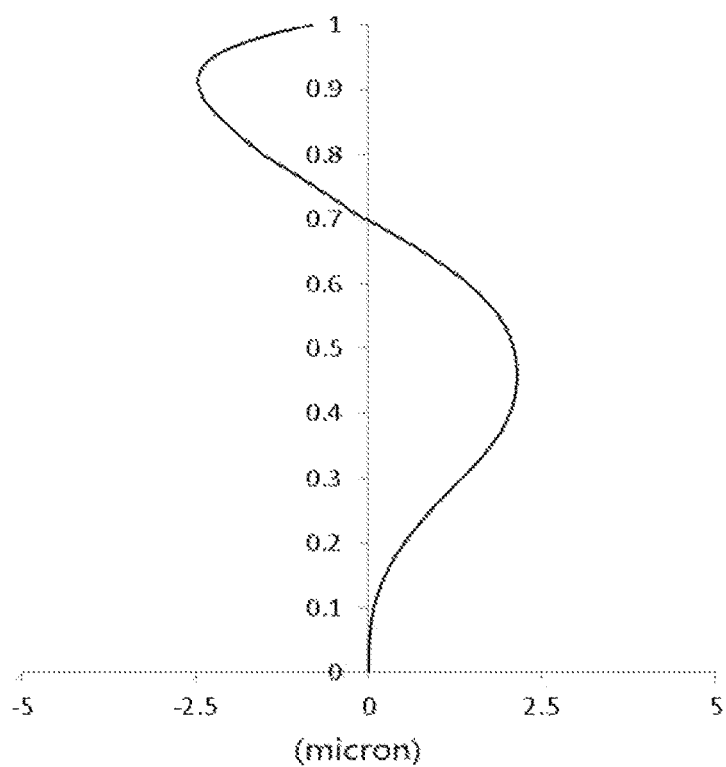

FIG. 10A shows an astigmatism curve of the wide-angle lens group according to embodiment 5 to represent a meridian image surface curvature and a sagittal image surface curvature. FIG. 10B illustrates a distortion curve of the wide-angle lens group according to embodiment 5 to represent a distortion value under different fields of view. FIG. 10C shows a lateral color curve of the wide-angle lens group according to embodiment 5 to represent deviation of different image heights on the imaging surface after the light passes through the lens. According to FIG. 10A to FIG. 10C, it can be seen that high imaging quality of the wide-angle lens group provided in embodiment 5 may be achieved.

Embodiment 6

Figure 11:
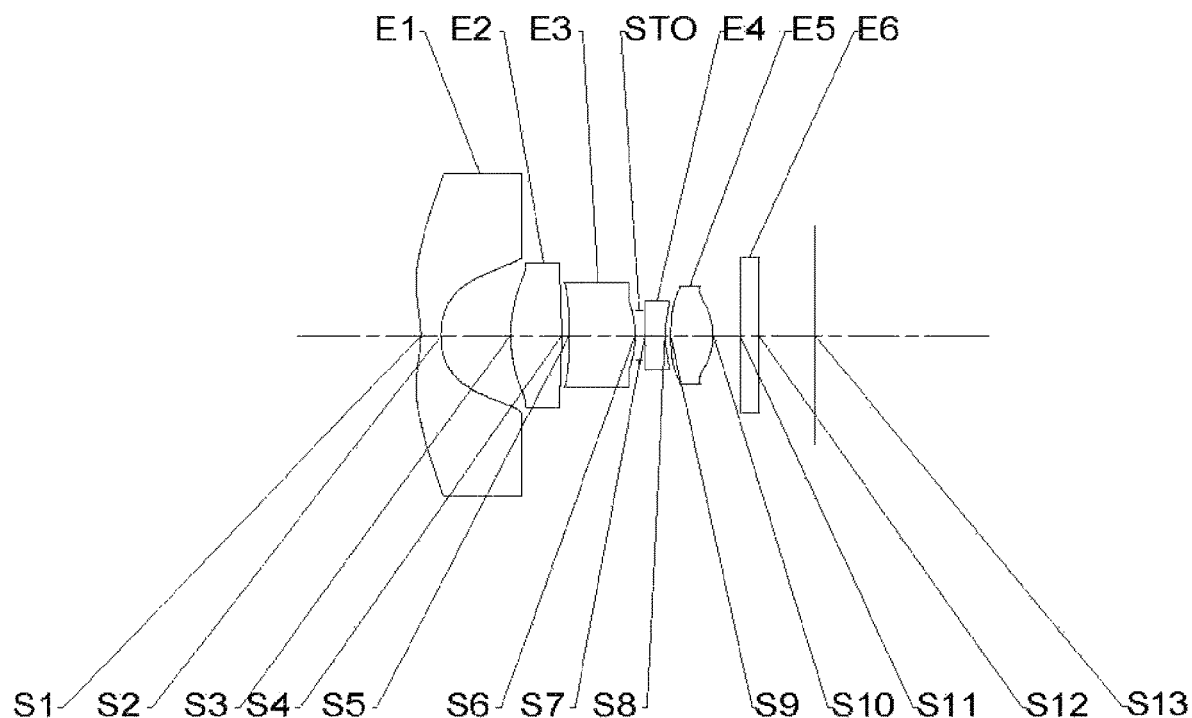
FIG. 11 is a structure diagram of a wide-angle lens group according to embodiment 6 of the disclosure.

A wide-angle lens group according to embodiment 6 of the disclosure will be described below with reference to FIG. 11 to FIG. 12C. FIG. 11 is a structure diagram of a wide-angle lens group according to embodiment 6 of the disclosure.

As shown in FIG. 11, the wide-angle lens group sequentially includes, from an object side to an image side along an optical axis, a first lens E1, a second lens E2, a third lens E3, a diaphragm STO, a fourth lens E4, a fifth lens E5, an optical filter E6 and an imaging surface S13.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a concave surface, while an image-side surface S6 is a convex surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The optical filter E6 has an object-side surface S11 and an image-side surface S12. Light from an object sequentially penetrates through each of the surfaces S1 to S12 and is finally imaged on the imaging surface S13.

Table 11 is a basic parameter table of the wide-angle lens group of embodiment 6, and units of the curvature radius, the thickness and the focal length therein are all millimeter (mm). Table 12 shows high-order coefficients applied to each aspheric mirror surface in embodiment 6. A surface type of each aspheric surface may be defined by the formula (1) given in embodiment 1.

TABLE 11

Embodiment 6: $TTL_W$ = 4.60 mm, $ImgH_W$ = 1.35 mm, Semi-$FOV_W$ = 66.7°, $Fno_W$ = 2.07, $f_W$ = 0.62 mm

| Surface number | Surface type | Curvature radius | Thickness | Material Refractive index | Abbe number | Focal length | Conic coefficient |
|---|---|---|---|---|---|---|---|
| OBJ | Spherical | Infinite | 412.1204 | | | | |
| S1 | Aspheric | −1.5161 | 0.2400 | 1.55 | 56.1 | −1.13 | −0.8783 |
| S2 | Aspheric | 1.0919 | 0.8086 | | | | 0.0752 |
| S3 | Aspheric | 1.6480 | 0.5907 | 1.67 | 20.4 | 2.51 | 0.6080 |
| S4 | Aspheric | 97.9056 | 0.0929 | | | | −98.9919 |
| S5 | Aspheric | −6.8235 | 0.7732 | 1.55 | 56.1 | 3.45 | 66.9059 |
| S6 | Aspheric | −1.5338 | 0.0500 | | | | 11.5560 |
| STO | Spherical | Infinite | 0.0643 | | | | 0.0000 |
| S7 | Aspheric | 2.3218 | 0.2400 | 1.67 | 20.4 | −3.12 | −42.0006 |
| S8 | Aspheric | 1.0503 | 0.0616 | | | | −1.6329 |
| S9 | Aspheric | 2.2001 | 0.4966 | 1.54 | 55.9 | 1.05 | 10.7394 |
| S10 | Aspheric | −0.6938 | 0.3125 | | | | 0.0000 |
| S11 | Spherical | Infinite | 0.2164 | 1.52 | 64.2 | | |
| S12 | Spherical | Infinite | 0.6532 | | | | |
| S13 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 7.1496E−01 | −7.3904E−01 | 5.4648E−01 | −2.8835E−01 | 1.0601E−01 | −2.6372E−02 | 4.2289E−03 | −3.9459E−04 | 1.6282E−05 |
| S2 | 4.3695E−01 | −2.4807E−01 | 6.0866E+00 | −1.0806E+01 | −2.5738E+01 | 1.2662E+02 | −1.9521E+02 | 1.3299E+02 | −3.3842E+01 |
| S3 | −3.5564E−01 | 1.5736E+00 | −2.4402E+00 | −6.3089E+00 | 4.0733E+01 | −9.5195E+01 | 1.1347E+02 | −6.7782E+01 | 1.6087E+01 |
| S4 | −4.7575E−01 | 5.5834E+00 | −3.2705E+01 | 1.0684E+02 | −2.2786E+02 | 3.3624E+02 | −3.3268E+02 | 1.9481E+02 | −4.9953E+01 |
| S | −5.1756E−01 | 8.1921E+00 | −7.6597E+01 | 4.2239E+02 | −1.5396E+03 | 3.8343E+03 | −6.3027E+03 | 6.1230E+03 | −2.6439E+03 |
| S6 | −1.5813E−01 | −4.1133E+00 | 3.9209E+02 | −9.3170E+03 | 1.2999E+05 | −1.1236E+06 | 5.9754E+06 | −1.8003E+07 | 2.3801E+07 |
| S7 | −2.0165E+00 | 4.0507E+01 | −1.7716E+03 | 5.3228E+04 | −1.0390E+06 | 1.2917E+07 | −9.8612E+07 | 4.2100E+08 | −7.6891E+08 |
| S8 | −1.7883E+00 | 7.7916E+00 | 3.8408E+01 | −1.6927E+03 | 2.0158E+04 | −1.3355E+05 | 5.1770E+05 | −1.0921 E+06 | 9.6248E+05 |
| S9 | −6.9094E−01 | 7.8189E+00 | −3.2611E+01 | 1.1301E+02 | −6.7054E+02 | 3.7244E+03 | −1.2121E+04 | 2.0478E+04 | −1.4190E+04 |
| S10 | 4.2795E−01 | 2.2990E+00 | −2.2487E+01 | 2.7118E+02 | −1.7100E+03 | 6.6864E+03 | −1.4846E+04 | 1.6782E+04 | −7.2767E+03 |

Figure 12A:
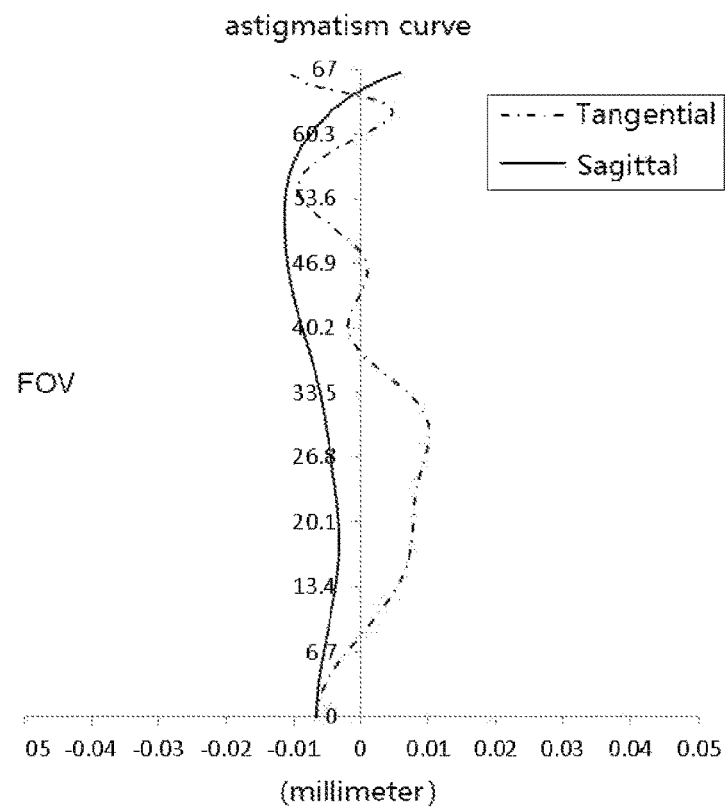
FIG. 12A to FIG. 12C show an astigmatism curve, a distortion curve and a lateral color curve of a wide-angle lens group according to embodiment 6 respectively.
Figure 12B:
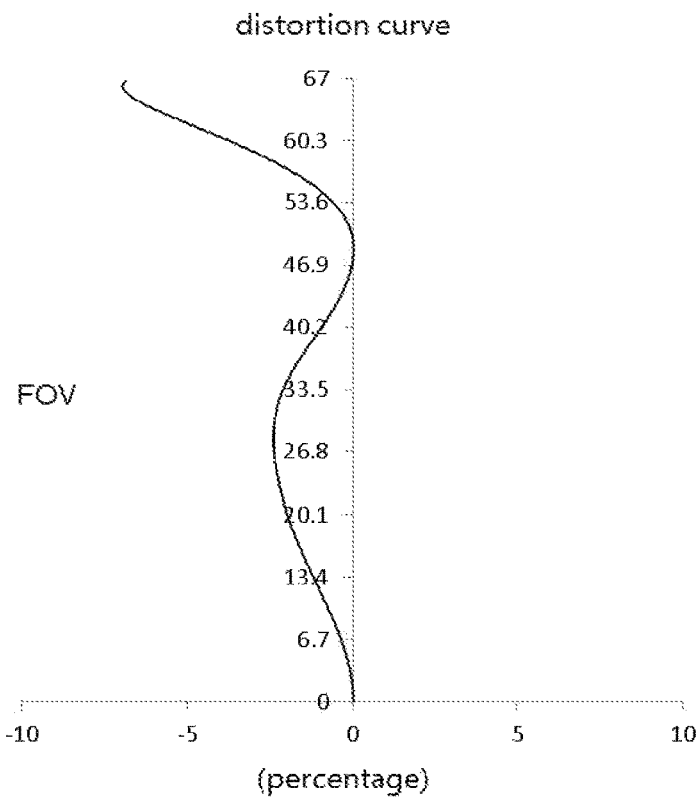
Figure 12C:
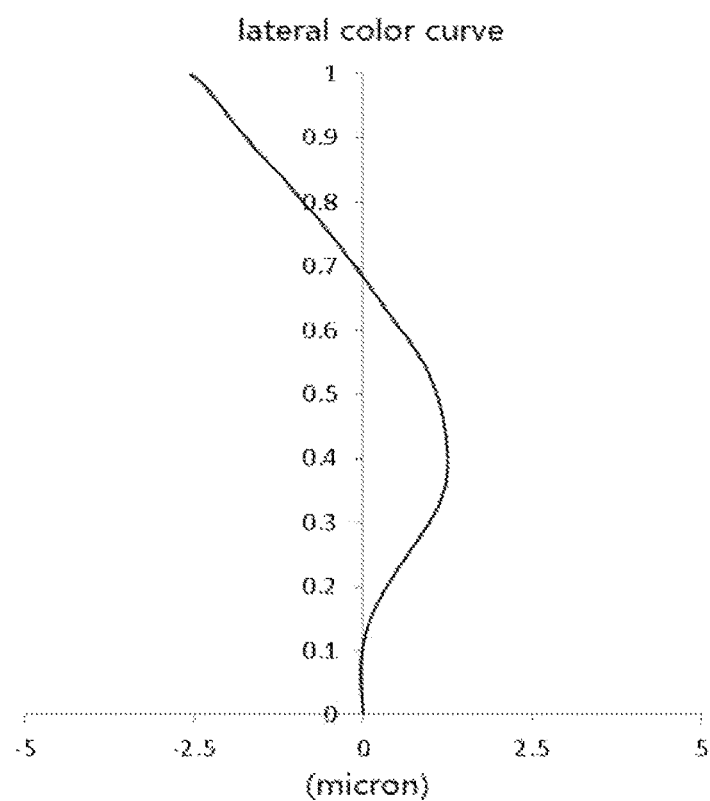

FIG. 12A shows an astigmatism curve of the wide-angle lens group according to embodiment 6 to represent a meridian image surface curvature and a sagittal image surface curvature. FIG. 12B illustrates a distortion curve of the wide-angle lens group according to embodiment 6 to represent a distortion value under different fields of view. FIG. 12C shows a lateral color curve of the wide-angle lens group according to embodiment 6 to represent deviation of different image heights on the imaging surface after the light passes through the lens. According to FIG. 12A to FIG. 12C, it can be seen that high imaging quality of the wide-angle lens group provided in embodiment 6 may be achieved.

From the above, embodiment 1 to embodiment 6 meet a relationship shown in Table 13 respectively.

TABLE 13

| Conditional expression/ embodiment | 1 | 2 | 3 | 4 | 5 | 6 |
|---|---|---|---|---|---|---|
| $T/ImgH_T$ | 2.63 | 2.71 | 2.96 | | | |
| $TTL_T/f_T$ | 0.84 | 0.84 | 0.81 | | | |
| $R4_T/R5_T$ | 1.31 | 2.05 | 1.06 | | | |
| $f_T/R1_T$ | 3.83 | 3.86 | 4.14 | | | |
| $(10 \times T45_T)/TTL_T$ | 2.27 | 2.90 | 2.85 | | | |
| $f1_T/SAG21_T$ | 24.50 | 32.59 | 28.67 | | | |
| $(10 \times CT2_W)/ImgH_W$ | | | | 5.62 | 5.88 | 4.38 |

Although both the telephoto lens group and the wide-angle lens group are described above with inclusion of five lenses as an example, it is understood by those skilled in the art that the number of the lenses forming the telephoto lens group and/or the wide-angle lens group may be changed without departing from the technical solutions claimed in the disclosure. If necessary, each of the telephoto lens group and the wide-angle lens group may also include another number of lenses. In addition, each abovementioned embodiment of the telephoto lens group and the wide-angle lens group may be freely combined without departing from the spirit and scope of the disclosure to achieve each result and advantage described in the specification.

The above description is only description about the preferred embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. A combined zoom dual-camera lens assembly, comprising a first lens group and a second lens group, wherein a field of view of the second lens group is larger than a field of view of the first lens group, and a thickness of the second lens group is smaller than a thickness of the first lens group; and a total effective focal length $f_T$ of the first lens group and a total effective focal length $f_W$ of the second lens group meet $f_T/f_W$>9.00;

the first lens group sequentially comprises, from an object side to an imaging surface of the first lens group along an optical axis of the first lens group;

a first lens with a positive refractive power, an object-side surface thereof being a convex surface;

a second lens with a refractive power, an image-side surface thereof being a concave surface;

a third lens with a refractive power, an object-side surface thereof being a convex surface;

a fourth lens with a refractive power; and a fifth lens with a refractive power, an object-side surface thereof being a convex surface, a curvature radius $R4_T$ of the image-side surface of the second lens of the first lens group and a curvature radius $R5_T$ of the object-side surface of the third lens of the first lens group meet 1.00<$R4_T/R5_T$<2.50.

2. The combined zoom dual-camera lens assembly according to claim 1, wherein $ImgH_T$ is a half of a diagonal length of an effective pixel region on an imaging surface of the first lens group, an overall thickness T of the combined zoom dual-camera lens assembly and $ImgH_T$ meet 2.00<$T/ImgH_T$<3.00.

3. The combined zoom dual-camera lens assembly according to claim 1, wherein the first lens group at least comprises a first lens closest to an object side;

the second lens group at least comprises a first lens closest to the object side; and a distance $TTL_T$ from an object-side surface of the first lens of the first lens group to an imaging surface of the first lens group on an optical axis of the first lens group and a distance $TTL_W$ from an object-side surface of the first lens of the second lens group to an imaging surface of the second lens group on an optical axis of the second lens group meet 1.00<$TTL_T/TTL_W$<1.50.

4. The combined zoom dual-camera lens assembly according to claim 1, wherein $ImgH_T$ is a half of a diagonal length of the effective pixel region on the imaging surface of the first lens group, $ImgH_W$ is a half of a diagonal length of an effective pixel region on the imaging surface of the second lens group, $ImgH_T$ and $ImgH_W$ meet 1.00<$ImgH_T/ImgH_W$<2.00.

5. The combined zoom dual-camera lens assembly according to claim 1, wherein a distance $TTL_T$ from the object-side surface of the first lens of the first lens group to the imaging surface of the first lens group on the optical axis of the first lens group and the total effective focal length $f_T$ of the first lens group meet $TTL_T/f_T$<1.00.

6. The combined zoom dual-camera lens assembly according to claim 1, wherein the total effective focal length $f_T$ of the first lens group and a curvature radius $R1_T$ of the object-side surface of the first lens of the first lens group meet 3.50<$f_T/R1_T$<4.50.

7. The combined zoom dual-camera lens assembly according to claim 1, wherein a spacing distance $T45_T$ of the fourth lens and fifth lens of the first lens group on the optical axis of the first lens group and a distance $TTL_T$ from the object-side surface of the first lens of the first lens group to the imaging surface of the first lens group on the optical axis of the first lens group meet 2.00<$(10 \times T45_T)/TTL_T$<3.00.

8. The combined zoom dual-camera lens assembly according to claim 1, wherein an effective focal length $f1_T$ of the first lens of the first lens group and an on-axis distance $SAG21_T$ from an intersection point of an object-side surface of the second lens of the first lens group and the optical axis of the first lens group to an effective radius vertex of the object-side surface of the second lens meet 20.00<$f1_T/SAG21_T$<35.00.

9. The combined zoom dual-camera lens assembly according to claim 1, wherein the second lens group sequentially comprises, from an object side to an imaging surface of the second lens group along the optical axis of the second lens group:

a first lens with a negative refractive power;

a second lens with a positive refractive power, an object-side surface thereof being a convex surface;

a third lens with a refractive power;

a fourth lens with a refractive power, an image-side surface thereof being a concave surface; and a fifth lens with a positive refractive power.

10. The combined zoom dual-camera lens assembly according to claim 9, wherein Semi-$FOV_W$ is a half of a maximum field of view of the second lens group, Semi-$FOV_W$ meets Semi-$FOV_W$>63.0°.

11. The combined zoom dual-camera lens assembly according to claim 9, wherein $ImgH_W$ is a half of a diagonal length of the effective pixel region on the imaging surface of the second lens group and a center thickness $CT2_W$ of the second lens of the second lens group on the optical axis of the second lens group meet 4.00<$(10 \times CT2_W)/ImgH_W$<6.00.

12. The combined zoom dual-camera lens assembly according to claim 9, wherein a spacing distance t between the first lens group and the second lens group meets 0.50 mm<t<3.00 mm.

13. A combined zoom dual-camera lens assembly, comprising a first lens group and a second lens group, wherein a field of view of the second lens group is larger than a field of view of the first lens group, and a thickness of the second lens group is smaller than a thickness of the first lens group; and $ImgH_T$ is a half of a diagonal length of an effective pixel region on an imaging surface of the first lens group, an overall thickness T of the combined zoom dual-camera lens assembly and $ImgH_T$ meet 2.00<$T/ImgH_T$<3.00;

the first lens group sequentially comprises, from the object side to the imaging surface of the first lens group along the optical axis of the first lens group;

the first lens with a positive refractive power, the object-side surface thereof being a convex surface;

a second lens with a refractive power, an object-side surface thereof being a convex surface;

a third lens with a refractive power, an object-side surface thereof being a convex surface while an image-side surface being a concave surface;

a fourth lens with a refractive power; and a fifth lens with a refractive power, an object-side surface thereof being a convex surface while an image-side surface being a concave surface, a curvature radius $R4_T$ of an image-side surface of the second lens of the first lens group and a curvature radius $R5_T$ of the object-side surface of the third lens of the first lens group meet 1.00<$R4_T/R5_T$<2.50.

14. The combined zoom dual-camera lens assembly according to claim 13, wherein the first lens group at least comprises a first lens closest to an object side;

the second lens group at least comprises a first lens closest to the object side; and a distance $TTL_T$ from an object-side surface of the first lens of the first lens group to the imaging surface of the first lens group on an optical axis of the first lens group and a distance $TTL_W$ from an object-side surface of the first lens of the second lens group to an imaging surface of the second lens group on an optical axis of the second lens group meet $1.00<TTL_T/TTL_W<1.50$.

15. The combined zoom dual-camera lens assembly according to claim 13, wherein $ImgH_W$ is a half of a diagonal length of an effective pixel region on the imaging surface of the second lens group, $ImgH_T$ and $ImgH_W$ meet $1.00<ImgH_T/ImgH_W<2.00$.

16. The combined zoom dual-camera lens assembly according to claim 15, wherein a total effective focal length $f_T$ of the first lens group and a total effective focal length $f_W$ of the second lens group meet $f_T/f_W>9.00$.

17. The combined zoom dual-camera lens assembly according to claim 13, wherein the second lens group sequentially comprises, from an object side to an imaging surface of the second lens group along the optical axis of the second lens group:

a first lens with a negative refractive power;

a second lens with a positive refractive power, an object-side surface thereof being a convex surface;

a third lens with a refractive power;

a fourth lens with a refractive power, an image-side surface thereof being a concave surface; and a fifth lens with a positive refractive power.

18. The combined zoom dual-camera lens assembly according to claim 17, wherein Semi-$FOV_W$ is a half of a maximum field of view of the second lens group, Semi-$FOV_W$ meets Semi-$FOV_W>63.0°$.

* * * * *